United States Patent
Lee et al.

(10) Patent No.: US 9,178,670 B2
(45) Date of Patent: Nov. 3, 2015

(54) DOWNLINK CONTROL INFORMATION TRANSMITTING METHOD AND BASE STATION, AND DOWNLINK CONTROL INFORMATION RECEIVING METHOD AND USER DEVICE

(75) Inventors: Moon Il Lee, Anyang-si (KR); Seung Hee Han, Anyang-si (KR); Jae Hoon Chung, Anyang-si (KR); Kyu Jin Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 69 days.

(21) Appl. No.: 13/511,623

(22) PCT Filed: Nov. 15, 2010

(86) PCT No.: PCT/KR2010/008034
§ 371 (c)(1),
(2), (4) Date: May 23, 2012

(87) PCT Pub. No.: WO2011/065695
PCT Pub. Date: Jun. 3, 2011

(65) Prior Publication Data
US 2012/0269151 A1 Oct. 25, 2012

Related U.S. Application Data

(60) Provisional application No. 61/264,701, filed on Nov. 27, 2009.

(30) Foreign Application Priority Data

Nov. 11, 2010 (KR) .................. 10-2010-0112046

(51) Int. Cl.
*H04W 72/04* (2009.01)
*H04L 5/00* (2006.01)

(52) U.S. Cl.
CPC .............. *H04L 5/0007* (2013.01); *H04L 5/001* (2013.01); *H04L 5/005* (2013.01); *H04L 5/0023* (2013.01);
(Continued)

(58) Field of Classification Search
CPC ..... H04L 5/0007; H04W 28/04; H04W 72/04; H04W 72/042; H04W 88/08
USPC ........................... 370/329; 455/450, 464, 509
See application file for complete search history.

(56) References Cited

U.S. PATENT DOCUMENTS 7,054,293 B2 * 5/2006 Tiedemann et al. .......... 370/335
7,519,043 B2 * 4/2009 Porter et al. .................. 370/347
(Continued)

FOREIGN PATENT DOCUMENTS

EP              2159947 A2 * 3/2010 ................ H04L 1/00

OTHER PUBLICATIONS

Fragouli, Christine; Sivaraman, Vijay; Srivastava, Mani; UCLA, Controlled Mulimedia Wireless Link Sharing via Enhanced Class-Based Queuing with Channel-State-Dependent Packet Scheduling, 0-7803-4386-7/98/$10.00 (c) 1998 IEEE.*
(Continued)

*Primary Examiner* — Mark Rinehart
*Assistant Examiner* — Peter Solinsky
(74) *Attorney, Agent, or Firm* — Dentons US LLP

(57) ABSTRACT

In the transmission of user data for a user equipment and control information on the user data to the user equipment using a plurality of carrier waves by a base station in a wireless communication system, the control information can be transmitted over a portion of the plurality of carrier waves, and carrier waves over which only the user data is transmitted can be generated without the control information. Here, the base station transmits, at a certain number of subframes following the subframes at which the control information is transmitted, the user data over the carrier waves to which only the user data is allocated. Thus, the user equipment can minimize the buffering of the user data during the detection of the control information, and decode the user data.

12 Claims, 19 Drawing Sheets

(52) U.S. Cl.
CPC ............ *H04L 5/0048* (2013.01); *H04L 5/0053* (2013.01); *H04L 5/0091* (2013.01); *H04W 72/042* (2013.01); *H04W 72/0453* (2013.01)

(56) References Cited

U.S. PATENT DOCUMENTS

| | | | | |
|---|---|---|---|---|
| 7,751,370 | B2* | 7/2010 | Tiedemann et al. | 370/335 |
| 8,082,371 | B2* | 12/2011 | Zinke et al. | 710/18 |
| 8,194,574 | B2* | 6/2012 | Shinozaki | 370/276 |
| 8,325,640 | B2* | 12/2012 | Park et al. | 370/311 |
| 8,340,014 | B2* | 12/2012 | Han et al. | 370/319 |
| 8,359,039 | B2* | 1/2013 | McBeath et al. | 455/450 |
| 8,385,959 | B2* | 2/2013 | Lee et al. | 455/509 |
| 8,432,859 | B2* | 4/2013 | Lee et al. | 370/329 |
| 8,477,682 | B2* | 7/2013 | Takeuchi et al. | 370/326 |
| 2009/0234464 | A1* | 9/2009 | Suzuki | 700/11 |
| 2009/0245188 | A1* | 10/2009 | Fukuoka et al. | 370/329 |
| 2010/0027446 | A1* | 2/2010 | Choi et al. | 370/280 |
| 2010/0074200 | A1* | 3/2010 | Li et al. | 370/329 |
| 2010/0098179 | A1* | 4/2010 | Bala et al. | 375/260 |
| 2010/0316146 | A1* | 12/2010 | McBeath et al. | 375/260 |
| 2011/0075611 | A1* | 3/2011 | Choi | 370/329 |
| 2011/0243066 | A1* | 10/2011 | Nayeb Nazar et al. | 370/328 |
| 2011/0292891 | A1* | 12/2011 | Hsieh et al. | 370/329 |
| 2012/0034945 | A1* | 2/2012 | Wang | 455/515 |
| 2012/0039275 | A1* | 2/2012 | Chen et al. | 370/329 |
| 2012/0044921 | A1* | 2/2012 | Chung et al. | 370/338 |
| 2012/0078933 | A1* | 3/2012 | Kim et al. | 707/758 |
| 2012/0113941 | A1* | 5/2012 | Chung et al. | 370/329 |
| 2012/0155312 | A1* | 6/2012 | Kim et al. | 370/252 |
| 2012/0195293 | A1* | 8/2012 | Pecen et al. | 370/336 |
| 2012/0281654 | A1* | 11/2012 | Aiba et al. | 370/329 |
| 2012/0303699 | A1* | 11/2012 | Luu et al. | 709/203 |
| 2012/0314627 | A1* | 12/2012 | Choi et al. | 370/280 |
| 2012/0327783 | A1* | 12/2012 | Moon et al. | 370/241 |
| 2013/0010709 | A1* | 1/2013 | Earnshaw et al. | 370/329 |
| 2013/0021898 | A1* | 1/2013 | Kang et al. | 370/216 |
| 2013/0064156 | A1* | 3/2013 | Park et al. | 370/311 |
| 2013/0142142 | A1* | 6/2013 | McBeath et al. | 370/329 |
| 2013/0163525 | A1* | 6/2013 | Moon et al. | 370/329 |
| 2013/0201921 | A1* | 8/2013 | Chen et al. | 370/329 |
| 2013/0215853 | A1* | 8/2013 | Li et al. | 370/329 |
| 2014/0050148 | A1* | 2/2014 | Choi | 370/328 |

OTHER PUBLICATIONS

ETSI TS 36.212, version 9.2.0, Release 9, Jun. 2010, Multiplexing and channel coding.*
3GPP TS 36.212 version 8.7.0 Release 8, Jun. 2009.*
ITRI, "Carrier Identification in PDCCH", 3GPP TSG RAN WG1 Meeting #57bis, Los Angeles, CA, Jun. 29-Jul. 3, 2009, R1-092683.
Catt et al. "Design of DL Control Channel for LTE-A with carrier aggregation", 3GPP TSG RAN WG1 Meeting #57bis, Los Angeles, CA, Jun. 29-Jul. 3, 2009, R1-092785.
InterDigital, "Multiple component carriers and carrier indication", 3GPP TSG RAN WG1 Meeting #57bis, Los Angeles, CA, Jun. 29-Jul. 3, 2009, R1-092589.
LG Electronics, "Component carrier indication by PDCCH for multiple carrier aggregation in LTE-Advanced", 3GPP TSG RAN WG1 Meeting #57bis, Los Angeles, CA, Jun. 29-Jul. 3, 2009, R1-092500.

* cited by examiner

DOWNLINK CONTROL INFORMATION TRANSMITTING METHOD AND BASE STATION, AND DOWNLINK CONTROL INFORMATION RECEIVING METHOD AND USER DEVICE

This Application is a 35U.S.C. §371 National Stage Entry of International Application No. PCT/KR2010/008034, filed Nov. 15, 2010 and claims the benefit of U.S. Provisional Application No: 61/264,701, filed Nov. 27, 2009, and Korean Application No: 10-2010-0112046, filed Nov. 11, 2010, all of which are incorporated by reference in their entirety herein.

FIELD OF THE INVENTION

The present invention relates to a wireless access system. And, more particularly, the present invention relates to a method for efficiently configuring control information in a system using multiple carriers. Also, in case the multiple carriers are configured to have different characteristics, the present invention relates to a method for maximizing the usage of the characteristics of each carrier.

BACKGROUND ART

Hereinafter, the structure of a wireless communication system and the assignment (or allocation) method of a radio channel, which are generally used, will be briefly described.

FIG. 1 illustrates a conceptual view of a communication system using at least one or more radio frequencies (RFs).

Referring to FIG. 1, a communication system supporting radio frequencies (RFs) may configure a communication system by using a total of N number of RFs. A BS (Base Station) may use one or more RFs so as to simultaneously transmit data to a single user equipment. And, similarly, a user equipment may also use one or more RFs so as to simultaneously transmit data to the base station. At this point, one RF may be configured by using each single Physical Channel or by using multiple physical channels. And, the base station and the user equipment may be provided with a plurality of transmission antennas (Tx). Such system may also be referred to as a multiple carrier system.

FIG. 2 illustrates exemplary structures of a transmitter and a receiver using multiple radio frequencies.

Referring to FIG. 2, the logical concept of a physical channel may be known by using an uplink channel and a downlink channel. In FIG. 2, N number of a radio frequencies may be configured (RF 1, RF 2, . . . , RF N), M number of physical channels may be configured (PHY 1, PHY 2, . . . , PHY M).

Signals that are generated from the transmitter through N number of RFs may be transmitted to a receiving end through M number of physical channels. At this point, the N number of signals may be scheduled to be simultaneously transmitted through an RF Multiplexer. The signals that are multiplexed through the RF multiplexer are transmitted from the transmitter to the receiver through $N_t$ number of physical transmission antennas (Tx).

The signals, which are transmitted as described above, may be received through $N_r$ number of receiving antennas (Rx) of a receiver, which supports Multi-RF reception through a radio channel. The signals that are received through $N_r$ number of reception antennas may be divided to M number of PHY channels through a Multiple RF Demultiplexer. The receiver may recover the signals that are transmitted from the transmitter through each of the divided PHY channels.

In each physical channel of the multi-RF transmitter and receiver, all methods being used in a system using the conventional single RF may be used. In configuring the system shown in FIG. 2, multiple RF communication modules may be configured, and a single RF module may be used, so as to sequentially generate and recover singles of multiple physical channels.

In case of using multiple RFs, a multiple antennas method or a control channel should be designed based upon the channel characteristics of each frequency. Unlike the case of using a single RF, when using multiple RFs, the channel characteristic for each RF may vary. Accordingly, by designing the multi-antenna method and control channel based upon the channel characteristic of each frequency, the system may be optimized. Additionally, among the multiple carriers, when some of the carriers are configured to have the same frame structure as a specific conventional system, the carrier is required to be configured so that the user equipment designed for the conventional system and the user equipment designed for the new system can both be operated.

DETAILED DESCRIPTION OF THE INVENTION

Technical Objects

The generally used multiple carrier system is disadvantageous in that the communication system fails to be optimized, since a multi-antenna method is applied without considering the frequency channel characteristic of each physical channel, or since a control channel is not designed in accordance with the corresponding system.

The present invention is designed to resolve the general technical disadvantages of the related art. Accordingly, the object of the present invention is to provide a method for enhancing the performance of a wireless access system.

Another object of the present invention is to provide an optimal transmission and reception method between an uplink and a downlink in order to enhance the performance of a communication system supporting multiple carriers.

Yet another object of the present invention is to provide an optimized communication system by applying a multi-antennas method based upon frequency channel characteristics for each carrier, or by designing a control channel.

Yet another object of the present invention is to provide a transmission and reception method optimized for each physical channel and also to provide system parameters optimized for each physical channel.

Yet another object of the present invention is to provide backward compatibility in the system proposed in the conventional system and the exemplary embodiments of the present invention by adequately modifying the control channel, in case the carrier reflecting the technical feature of the present invention has the same frame structure as a specific conventional system.

A further object of the present invention is to decrease the complexity in implementing the user equipment, by minimizing data buffering, which is performed to decode user data.

Technical Solutions

In order to resolve the technical objects of the present invention, the present invention discloses a method for transmitting a downlink control signal in order to enhance the performance of a wireless access system.

A base station transmit user data for a user equipment and control information for the user data to the user equipment using multiple carriers in a wireless communication system, wherein the base station may transmit the control information through only a portion of the multiple carriers, and configure a carrier through which only the user data is being transmitted without the control information. At this point, on a carrier having only the user data allocated thereto without the control information, the base station transmits the user data after a predetermined number of subframes from the subframe through which the control information is transmitted.

According to an aspect of the present invention, a method of a base station for transmitting downlink control information to a user equipment using a plurality of carriers, in a wireless communication system, is provided. The method includes the steps of allocating user data designated for the user equipment to the plurality of carriers; and allocating control information for the user data to at least one of the plurality of carriers; transmitting the user data and the control information to the user equipment, wherein, on a carrier allocated only with the user data from among the plurality of carriers, the user data is transmitted after k number of subframes from a subframe in which the control information is transmitted.

According to another aspect of the present invention, a method of a user equipment using a plurality of carriers for receiving downlink control information from a base station, in a wireless communication system, is provided. The method includes the steps of receiving control information designated for the user equipment from at least one of the plurality of carriers; and receiving user data designated for the user equipment through the plurality of carriers based on the control information, wherein, on a carrier allocated only with the user data from among the plurality of carriers, the user data is received after k number of subframes from a subframe in which the control information is transmitted.

According to yet another aspect of the present invention, a base station transmitting downlink control information to a user equipment using a plurality of carriers, in a wireless communication system, is provided. The base station includes a transmitter configured to transmit radio signals to the user equipment through the plurality of carriers; and a processor configured to allocate user data designated for the user equipment to the plurality of carriers, and to allocate control information for the user data to at least one of the plurality of carriers, wherein the processor is connected to the transmitter and control the transmitter to transmit the user data and the control information to the user equipment, and wherein the processor controls the transmitter to transmit, on a carrier allocated only with the user data, the user data after k number of subframes from a subframe in which the control information is transmitted.

According to a further aspect of the present invention, a user equipment using a plurality of carriers so as to receive downlink control information from a base station, in a wireless communication system is disclosed. The user equipment includes a receiver configured to receive radio signals from the user equipment through the plurality of carriers; and a processor configured to control the receiver to receive control information designated for the user equipment on at least one of the plurality of carriers; and configured to control the receiver to receive user data designated for the user equipment through the plurality of carriers based on the control information, wherein the processor controls the receiver so that, on a carrier allocated only with the user data, the receiver receives the user data after k number of subframes from a subframe in which the control information is transmitted.

In each aspect of the present invention, k may be a positive integer.

In each aspect of the present invention, k is equal to 1 or 2.

In each aspect of the present invention, information indicating k is further received from the base station.

In each aspect of the present invention, the control information and k are transmitted through a PDCCH (Physical Downlink Control Channel), and wherein the user data is transmitted through a PDSCH (Physical Downlink Shared Channel).

The technical objects of the present invention merely correspond to a portion of the exemplary embodiments of the present invention. Therefore, various embodiments of the present invention reflecting the technical characteristics of the present invention may be devised and understood by anyone skilled in the art based upon detailed description of the present invention, which will be provided below.

Effects of the Invention

According to the exemplary embodiments of the present invention, the present invention may have the following effects.

Firstly, by using the exemplary embodiments of the present invention, the performance of the wireless access system may be enhanced. Accordingly, in an uplink communication and a downlink communication of a communication system supporting multiple carriers, an optimal transmission and reception method may be applied.

Secondly, by applying a multi-antennas method based upon the frequency channel characteristic for each carrier, an optimal communication system may be implemented.

Thirdly, by promoting backward compatibility between a communication system reflecting the technical spirit of the present invention and the conventional system, data may be efficiently transmitted and received.

Fourthly, since the corresponding user data is not transmitted while the user equipment according to the present invention detects (or searches for) the control information, the user data may be decoded with minimum buffering.

Finally, among the multiple carriers, some of the carriers carry reference signals in only some of the subframes. Thus, the performance of the wireless communication system may be enhanced.

The effects that may be gained from the embodiment of the present invention will not be limited only to the effects described above. Accordingly, additional effects of the present application will be set forth in part in the description which follows and in part will become apparent to those having ordinary skill in the art upon examination of the following or may be learned from practice of the present application. More specifically, unintended effects obtained upon the practice of the present invention may also be derived by anyone having ordinary skill in the art.

BEST MODE FOR CARRYING OUT THE PRESENT INVENTION

Figure 1:
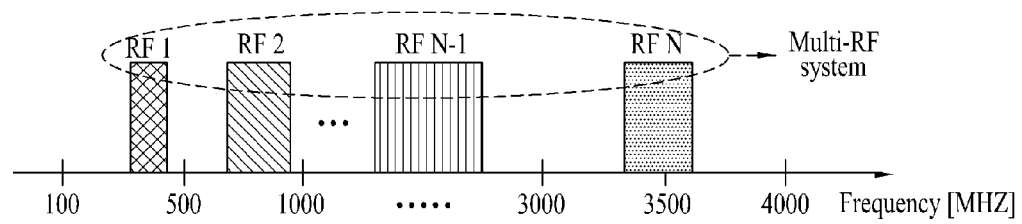
FIG. 1 illustrates a conceptual view of a communication system using at least one or more radio frequencies (RFs).
Figure 2:
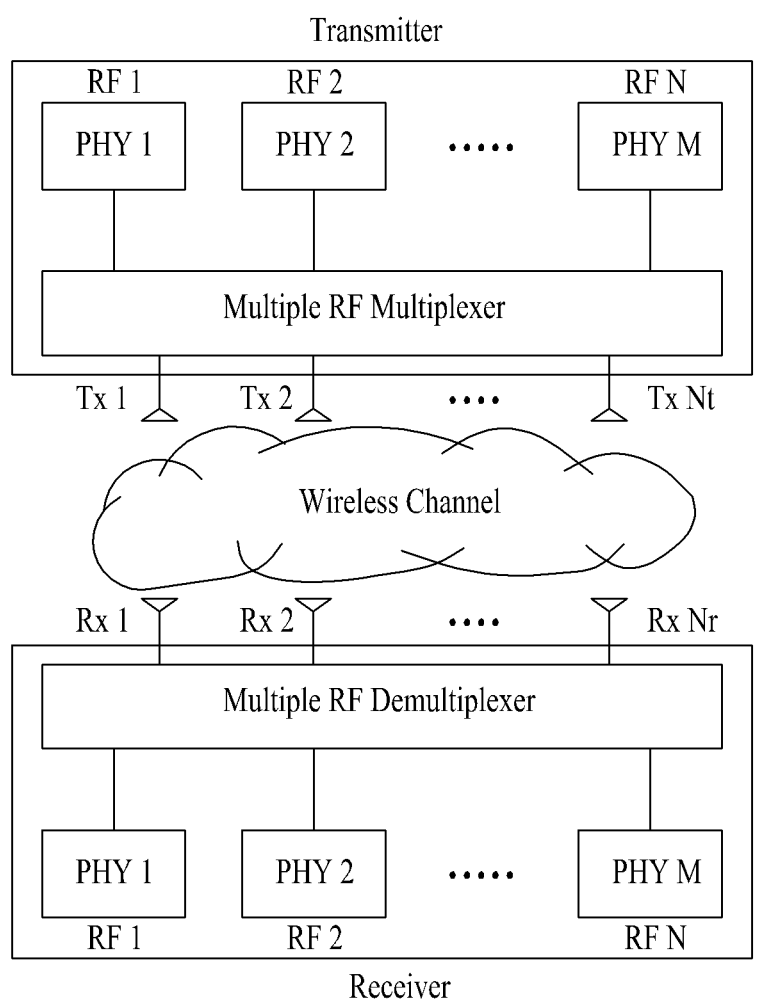
FIG. 2 illustrates a block view showing components of a user equipment and base station performing the method according to the present invention.

Hereinafter, the preferred embodiments of the present invention will now be described in detail with reference to the accompanying drawings. The detailed description of the present invention that is to be disclosed along with the appended drawings is merely given to provide to describe the exemplary embodiments of the present invention. In other words, the embodiments presented in this specification do not correspond to the only embodiments that can be realized according to the present invention. In the following description of the present invention, the description of detailed features of the present invention will be given in order to provide a full and complete understanding of the present invention. However, it will be apparent to those skilled in the art that the present invention can be realized even without the detailed features described herein.

Additionally, the technique and device, and system that will hereinafter be described may be applied to diverse wireless multiple access systems. Examples of a multiple access system include a CDMA (code division multiple access) system, an FDMA (frequency division multiple access) system, a TDMA (time division multiple access) system, an OFDMA (orthogonal frequency division multiple access) system, an SC-FDMA (single carrier frequency division multiple access) system, an MC-FDMA (multi carrier frequency division multiple access) system, and so on. The CDMA may be embodied in wireless technology, such as UTRA (Universal Terrestrial Radio Access) or CDMA2000. The TDMA may be embodied in wireless technology, such as GSM (Global System for Mobile communications)/GPRS (General Packet Radio Service)/EDGE (Enhanced Data Rates for GSM Evolution). The OFDMA may be embodied in wireless technology, such as IEEE (Institute of Electrical and Electronics Engineers) 802.11 (Wi-Fi), IEEE 802.16 (WiMAX), IEEE 802-20, and E-UTRA(Evolved UTRA). The UTRA is a part of the UMTS (Universal Mobile Telecommunications System), and the 3GPP (3rd Generation Partnership Project) LTE (long term evolution) is a part of the E-UMTS (Evolved UMTS), which uses E-UTRA. In a downlink communication, the 3GPP LTE adopts the OFDMA, and, in an uplink communication, the 3GPP LTE adopts the SC-FDMA. The LTE-A (LTE-advanced) is an evolved version of the 3GPP LTE. For simplicity, the present invention will be described in detail as follows based upon an assumption that the present invention is being applied to a 3GPP LTE/LTE-A system. However, the technical aspects of the present invention will not be limited only to this assumption. For example, although the present invention will be described in detail as follows based upon a mobile communication system corresponding to the 3GPP LTE/LTE-A system, with the exception for the unique and typical features of the 3GPP LTE/LTE-A system, the present invention may also be applied to other random mobile communication systems.

In some cases, in order to avoid any ambiguity in the concept (or idea) of the present invention, some of the structures and devices disclosed (or mentioned) in the present invention may be omitted from the accompanying drawings of the present invention, or the present invention may be illustrated in the form of a block view focusing only on the essential features or functions of each structure and device. Furthermore, throughout the entire description of the present invention, the same reference numerals will be used for the same elements of the present invention.

According to the present invention, the user equipment (UE) may either be fixed or be mobile. And, diverse devices communicating with the base station so as to transmit and/or receive user data and/or diverse control information may correspond to the user equipment. The term user equipment may also be referred to as Terminal Equipment, MS (Mobile Station), MT (Mobile Terminal), UT (User Terminal), SS (Subscribe Station), wireless device, PDA (Personal Digital Assistant), wireless modem, handheld device, and so on. Additionally, according to the present invention, a Base Station (BS) generally refers to a fixed station, which communicates with a user equipment and/or another base station, and the base station communicates with the user equipment and another base station, so as to exchange diverse data and control information to and from one another. The term base station may also be referred to as eNB (evolved-Node B), BTS (Base Transceiver System), Access Point, and so on.

One RF may have one physical channel or a plurality of physical channels. However, in the following description of the present invention, it will be assumed that one RF basically has one physical channel, for simplicity. In a wireless communication system supporting multiple RFs, one RF will also be referred to as a component carrier (CC).

Also, hereinafter, a user equipment (UE) that may use a single carrier, i.e., a single CC, may be referred to as an LTE UE, and a user equipment that is configured to use multiple carriers, i.e., multiple CCs, may be referred to as an LTE-A UE.

Furthermore, a CC that may be used by both the LTE UE and the LTE-A UE may be referred to as a normal CC, and a CC that may be used only by the LTE-A UE may be referred to as an LTE-A CC.

Meanwhile, in the description of the present invention, the process of allocating data or control information to a frame/subframe/symbol/carrier/subcarrier and transmitting the allocated data or control information may signify that the data or control information is being transmitted in the corresponding frame/subframe/symbol time section/timing through the corresponding carrier/subcarrier.

Figure 3:
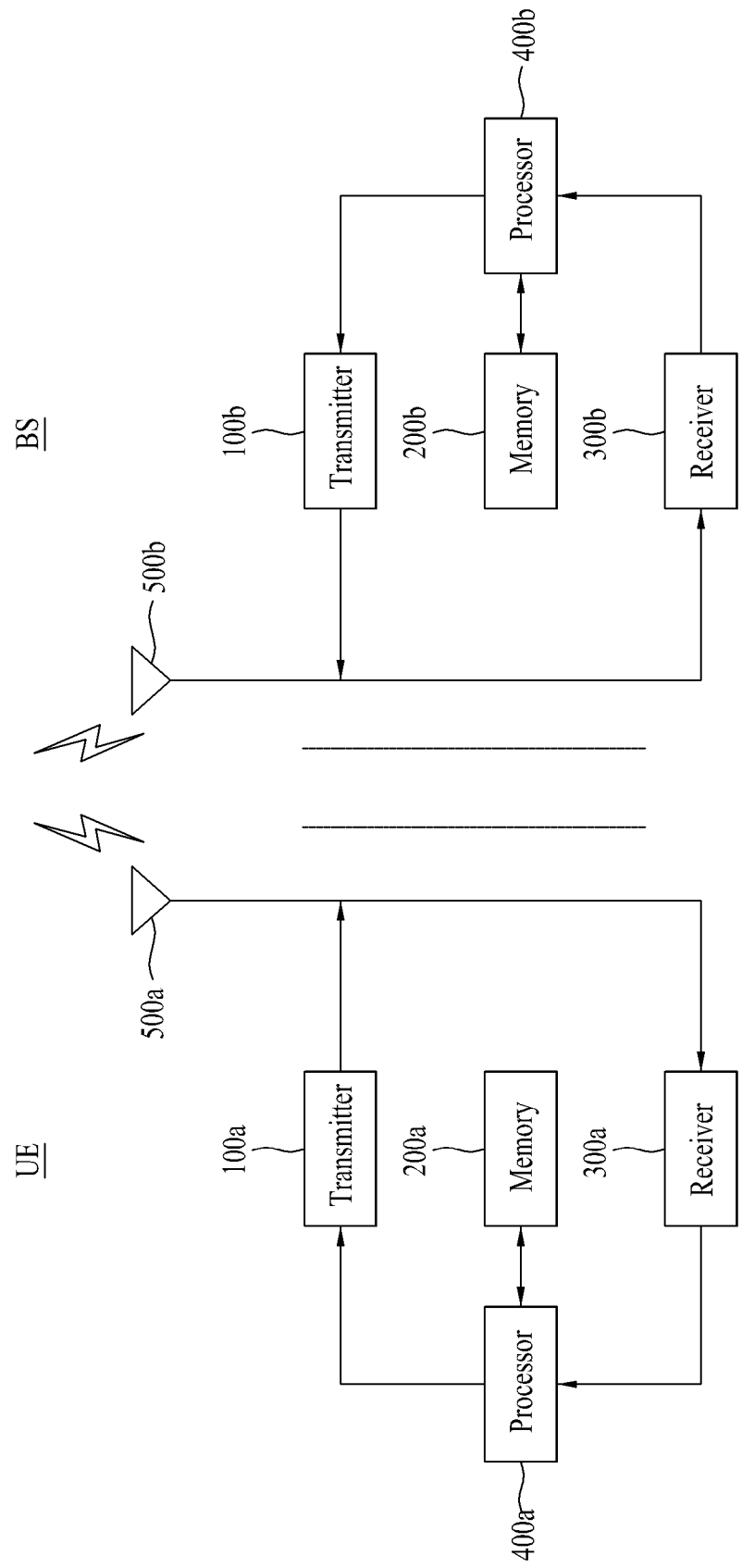
FIG. 3 illustrates a block view showing components of a user equipment (UE) and base station performing the method according to the present invention.

FIG. 3 illustrates a block view showing components of a user equipment (UE) and base station performing the method according to the present invention.

The UE operates as a transmitting device in an uplink and operates as a receiving device in a downlink. Conversely, the base station operates as a receiving device in an uplink and operates as a transmitting device in a downlink.

Each of the UE and the base station includes an antenna (500a, 500b) that can receive information and/or data, signals, messages, and so on, a transmitter (100a, 100b) transmitting messages by controlling the antenna, a receiver (300a, 300b) receiving messages by controlling the antenna, and a memory (200a, 200b) storing diverse information related to communication within the wireless communication system. Also, each of the UE and the base station includes a processor (400a, 400b), which is configured to perform the present invention by controlling the components included in the UE or the base station, such as the transmitter and the receiver, and the memory, and so on. The transmitter (100a), the receiver (300a), the memory (200a), and the processor (400a) included in the UE may each be implemented as independent elements by using separate chips, or a combination of at least two or more elements may be implemented by using a single chip. Similarly, the transmitter (100b), the receiver (300b), the memory (200b), and the processor (400b) included in the base station may each be implemented as independent elements by using separate chips, or a combination of at least two or more elements may be implemented by using a single chip. The transmitter and receiver may also be combined so as to be implemented as a single transceiver within the user equipment or the base station.

The antenna (500a, 500b) performs the function of transmitting a signal, which is generated from the transmitter (100a, 100b), to an outside target, or the antenna (500a, 500b) performs the functions of receiving a radio signal from an outside source and delivering the received radio signal to the receiver (300a, 300b). The antenna (500a, 500b) may also be referred to as an antenna port. Each antenna port may correspond to one physical antenna or may be configured of a combination of more than one physical antenna. In case of a transceiver supporting the Multi-Input Multi-Output (MIMO) function, which transmits and receives data by using multiple antennas, the transceiver may be connected to 2 or more antennas.

The processor (400a, 400b) generally controls the overall operations of each module within the UE or the base station. Most particularly, the processor (400a, 400b) may perform various control functions for performing the present invention, MAC (Medium Access Control) frame variable control functions for service characteristics and frequency environments, power saving mode functions for controlling idle mode operations, Hand Over functions, certification and encryption functions, and so on. The processor (400a, 400b) may also be referred to as a controller, a microcontroller, a microprocessor, a microcomputer, and so on. Meanwhile, the processor (400a, 400b) may be implemented in the form of hardware or firmware, or software, or in a combination of at least two or more of hardware, firmware, and software. In case of implementing the embodiments of the present invention by using hardware, ASICs (Application Specific Integrated Circuits) or DSPs (Digital Signal Processors), DSPDs (Digital Signal Processing Devices), PLDs (Programmable Logic Devices), FPGAs (Field Programmable Gate Arrays), and so on, which are configured to perform the present invention, may be provided in the processor (400a, 400b). Meanwhile, in case of implementing the embodiments of the present invention by using firmware or software, the firmware or software may be configured to include a module, procedure, or function performing the above-described functions or operations, and the firmware or software, which is configured to perform the present invention may be provided in the processor (400a, 400b), or may be stored in the memory (200a, 200b) so as to be operated by the processor (400a, 400b).

The transmitter (100a, 100b) performs coding and modulation on signals and/or data that are to be scheduled by the processor (400a, 400b) or by a scheduler being connected to the processor, so as to be transmitted to an outside target and, then, transmits the processed signals and/or data to the antenna (500a, 500b). For example, the transmitter (100a, 100b) converts a data sequence being transmitted to K number of layers by performing demultiplexing, channel encoding, and modulation processes. The K number of layers passes through a transmission processor included in the transmitter, so as to be transmitted through the transmitting antenna (500a, 500b). The transmitter (100a, 100b) and the receiver (300a, 300b) of the UE and the base station may each be differently configured depending upon the procedures for processing the transmission signal and the reception signal.

Figure 4:
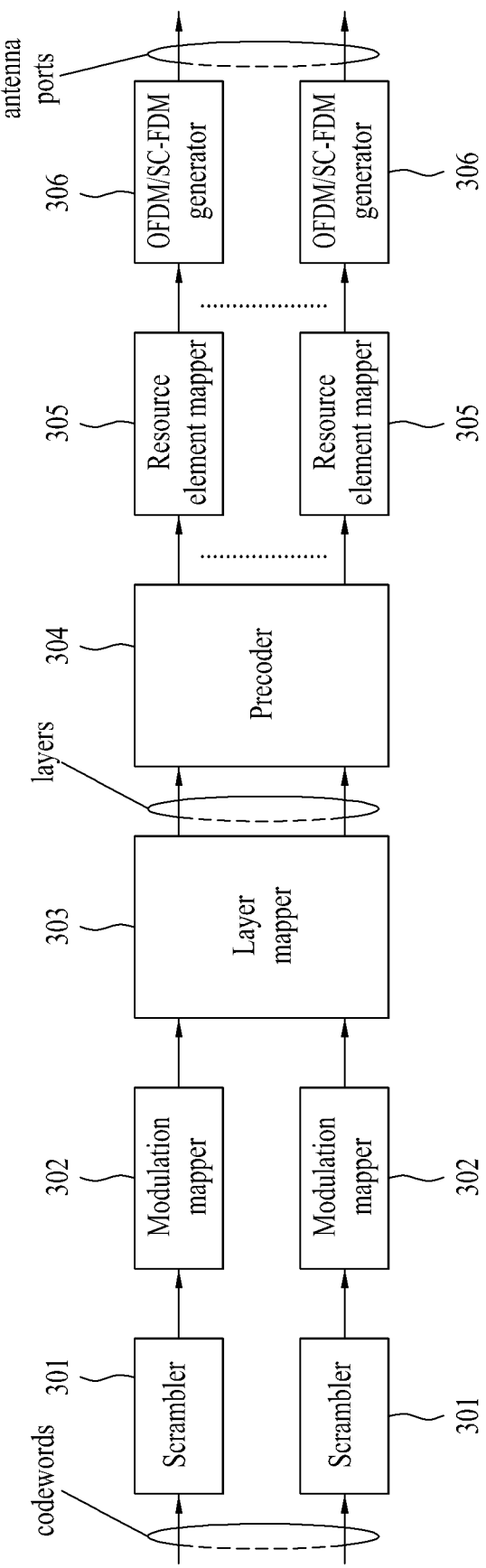
FIG. 4 illustrates an exemplary structure of a transmitter within the user equipment and the base station.

FIG. 4 illustrates an exemplary structure of a transmitter within the user equipment and the base station. The operations of the transmitter (100a, 100b) will hereinafter be described in detail with reference to FIG. 3.

Referring to FIG. 4, the transmitter (100a, 100b) within each of the UE or the base station may include a scrambler (301) and a modulation mapper (302), a layer mapper (303), a precoder (304), a resource element mapper (305), and an OFDM/SC-FDM signal generator (306).

The transmitter (100a, 100b) may transmit at least one or more codewords. Coded bits within each codeword are each scrambled by the scrambler (301) and then transmitted on the physical channel. The codeword may also be referred to as a data sequence, and the codeword is equivalent to a data block being provided by a MAC layer. The data block being provided by the MAC layer may also be referred to as a transmission block.

The scrambled bits are modulated to complex-valued modulation symbols by the modulation mapper (302). The modulation mapper modulates the scrambled bits in accordance with a pre-decided modulation scheme, so that the modulated bits may be positioned as complex-value modulation symbols, which indicate the corresponding positions over a signal constellation. There is no limitation in the modulation scheme. And, therefore, m-PSK (m-Phase Shift Keying) or m-QAM (m-Quadrature Amplitude Modulation) may be used for the modulation process of the coded data.

The complex-value modulation symbols may be mapped to at least one or more transmission layers by the layer mapper (303).

The complex-value modulation symbol over each layer is precoded by the precoder (304) for the transmission over an antenna port. More specifically, the precoder (304) processes the complex-value modulation symbols by using an MIMO scheme (or method) with respect to multiple transmission antennas (500-1, 500-2, . . . , 500-$N_t$), so as to output the antenna-specific symbols, thereby distributing the antenna-specific symbols to the corresponding resource element mapper (305). More specifically, the process of mapping a transmission layer to an antenna port is performed by the precoder (304). The precoder (304) may multiply the output x of the layer mapper (303) by a precoding matrix W of $N_t \times M_t$, so as to output a matrix z of $N_t \times M_F$.

The resource element mapper (305) maps/allocates the complex-valued modulation symbols for each antenna port to adequate resource elements. The resource element mapper (305) may allocate the complex-valued modulation symbols for each of the antenna ports to adequate subcarriers and may then multiplex the allocated complex-valued modulation symbols in accordance with the user.

The OFDM/SC-FDM signal generator (306) modulates complex-valued modulation symbols for each of the antenna ports, i.e., antenna specific symbols, by using the OFDM or SC-FDM scheme, so as to generate complex-valued time domain OFDM (Orthogonal Frequency Division Multiplexing) symbol signals or SC-FDM (Single Carrier Frequency Division Multiplexing) symbol signals. The OFDM/SC-FDM signal generator (306) may perform IFFT (Inverse Fast Fourier Transform) with respect to an antenna specific symbol, and a CP (Cyclic Prefix) may be inserted in a time domain symbol being processed with IFFT. The OFDM symbol may be processed with procedures, such as digital-to-analog conversion, frequency up-conversion, and so on, so as to be transmitted to a receiving device through each transmission antenna (500-1, ..., 500-$N_t$). The OFDM/SC-FDM signal generator (306) may include an IFFT module and a CP inserter, a DAC (Digital-to-Analog Converter), a frequency uplink converter, and so on.

Meanwhile, in case the transmitter (100a, 100b) adopts the SC-FDM access (SC-FDMA) scheme for performing the codeword transmission, the transmitter (100a, 100b) may include a fast Fourier transformer. The fast Fourier transformer may perform FFT (Fast Fourier Transform) on the antenna specific symbol, so as to output the fast Fourier transformed symbol to the resource element mapper (305).

The signal processing procedure of the receiver (300a, 300b) may be configured as the inverse process of the signal processing procedure of the transmitter. Most particularly, the receiver (300a, 300b) may perform decoding and demodulation of a radio signal, which is received from an external source through the antenna (500a, 500b), so as to deliver the processed signal to the respective processor (400a, 400b). The antenna (500a, 500b), which is connected to the receiver (300a, 300b) may include $N_r$ number of multiple receiving antennas, and each of the signals being received through the receiving antennas is recovered as a baseband signal and then processed with multiplexing and MIMO demodulation processes, so as to be recovered as data sequences, which were initially intended to be transmitted by the transmitter (100a, 100b). The receiver (300a, 300b) may include a signal recovery unit being configured to recover the received signal to a baseband signal, a multiplexer being configured to combine and multiplex the reception-processed signals, and a channel demodulator being configured to demodulate the multiplexed signal sequence to the corresponding codeword. Herein, the signal recovery unit, the multiplexer, and the channel modulator may be configured as a single collective module performing each of the corresponding functions, or may each be configured as an independent module. More specifically, the signal recovery unit may include an ADC (analog-to-digital converter) being configured to convert an analog signal to a digital signal, a CP remover being configured to remove the CP from the digital signal, an FFT module being configured to apply FFT (fast fourier transform) on a signal processed with CP removal so as to output a frequency domain symbol, and a resource element demapper/equalizer being configured to recover the frequency domain symbol to an antenna specific symbol. The antenna specific symbol may be recovered to a transmission (or transport) layer by the multiplexer, and the transmission layer may be recovered to as codeword, which was initially intended to be transmitted by the transmission device, by the channel demodulator.

Meanwhile, in case the receiver (300a, 300b) receives an SC-FDM signal, the receiver (300a, 300b) additionally includes an IFFT module. The IFFT module performs IFFT on an antenna specific symbol, which is recovered by the resource element demapper, so as to output an inverse fast Fourier transformed symbol to the multiplexer.

For reference, although it is described in FIG. 3 and FIG. 4 that the scrambler (301) and the demodulation mapper (302), the layer mapper (303), the precoder (304), the resource element mapper (305), and the OFDM/SC-FDMA signal generator (306) are included in the transmitter (100a, 100b), the processor (400a, 400b) of the transmitting device may also be configured to include the scrambler (301) and the demodulation mapper (302), the layer mapper (303), the precoder (304), the resource element mapper (305), and the OFDM/SC-FDMA signal generator (306). Similarly, although it is described in FIG. 3 and FIG. 4 that the signal recovery unit, the multiplexer, and the channel modulator are included in the receiver (300a, 300b), the processor (400a, 400b) of the receiving device may be configured to include the signal recovery unit, the multiplexer, and the channel modulator. Hereinafter, for simplicity, it will be described that the scrambler (301) and the demodulation mapper (302), the layer mapper (303), the precoder (304), the resource element mapper (305), and the OFDM/SC-FDMA signal generator (306) are included in the transmitter (100a, 100b), which is separated from a processor (400a, 400b) being configured to control the operations of the above-mentioned elements, and also that the signal recovery unit, the multiplexer, and the channel modulator are included in the receiver (300a, 300b), which is separated from a processor (400a, 400b) being configured to control the operations of the above-mentioned elements. Nevertheless, the exemplary embodiments of the present invention may also be identically applied to a case when the scrambler (301) and the demodulation mapper (302), the layer mapper (303), the precoder (304), the resource element mapper (305), and the OFDM/SC-FDMA signal generator (306) are included in the processor (400a, 400b), and to a case when the signal recovery unit, the multiplexer, and the channel modulator are included in the processor (400a, 400b).

The memory (200a, 200b) may store a program configured to process and control the processor (400a, 400b), and the memory (200a, 200b) may also temporarily store inputted/outputted data. Furthermore, the memory may be implemented by using a storage medium of at least one of a flash memory type, a hard disk type, a multimedia card micro type, a card type memory (e.g., SD or XD memory, etc.), Random Access Memory (RAM), Read-Only Memory (ROM), EEPROM (Electrically Erasable Programmable Read-Only Memory), PROM (Programmable Read-Only Memory), magnetic memory, magnetic disk, and optical disk.

Figure 5:
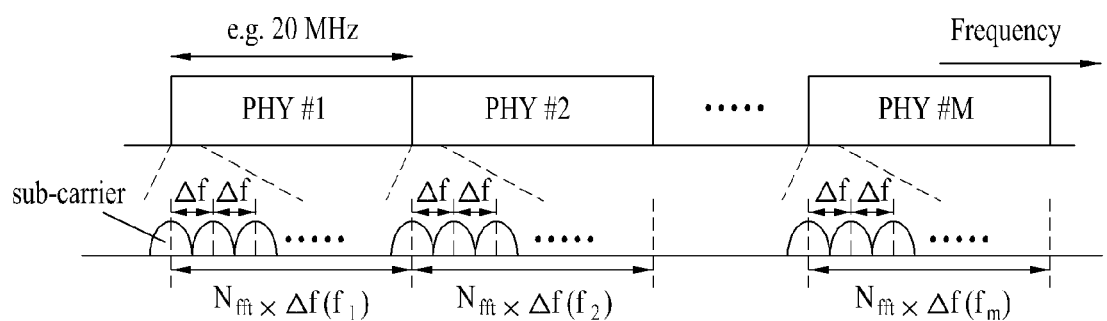
FIG. 5 and FIG. 6 illustrate physical channels and subcarriers configuring the physical channel.
Figure 6:
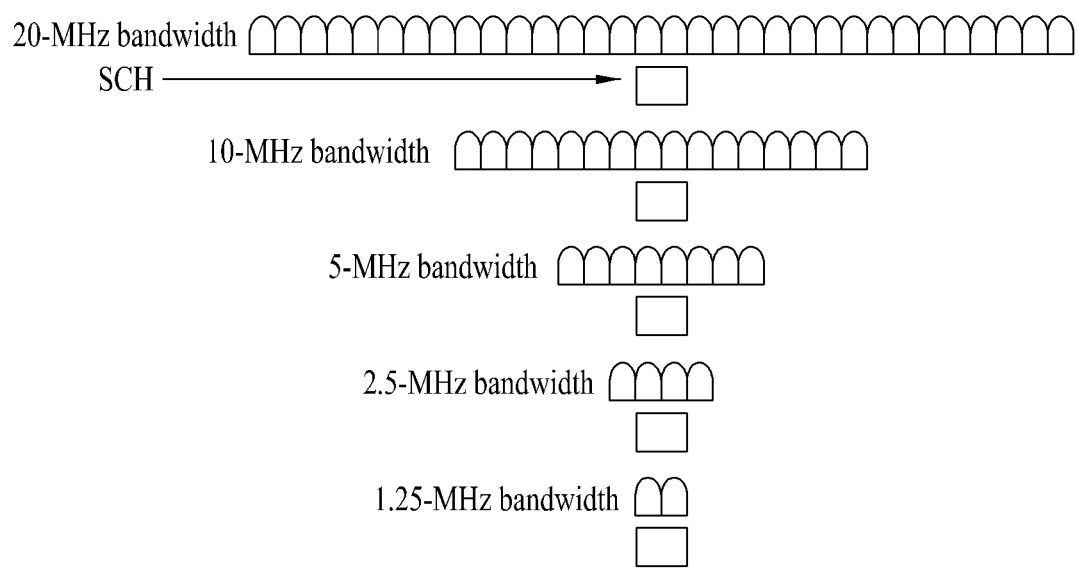

FIG. 5 and FIG. 6 illustrate physical channels and subcarriers configuring the physical channel.

Referring to FIG. 5, one physical channel may have a predetermined bandwidth, e.g., the size of 20 MHz. M number of physical channels each has a BandWidth of $N_{fft}*\Delta f$, and $\Delta f$ indicates a frequency unit of a subcarrier. Also, each physical channel may have a center frequency of $f_i$ (i=1, 2, ..., M). At this point, each center frequency may be separated from one another at a constant interval or may be positioned to be spaced apart from one another at irregular intervals. Furthermore, depending upon the cell of the UE or the base station, a bandwidth having a size smaller than the maximum bandwidth may also be used as each physical channel as shown in FIG. 6.

Meanwhile, an SCH (synchronization channel for a Cell Search) may exist in all bandwidths. Therefore, since the synchronization channel (SCH) is required to be linked to all physical channels, all UEs may be synchronized to the corresponding cell. In case the system is configured as shown in FIG. 5 and FIG. 6, the UE or the base station may use one or more physical channels so as to transmit and receive data.

The number of physical channels that may be used by the UE and the base station may differ from one another. For example, the base station may be designed to use all M number of physical channels, and the UE may be designed to use L number physical channels. At this point, the size of L may be equal to or smaller than M. And, the number of L may vary depending upon the UE type.

Figure 7:
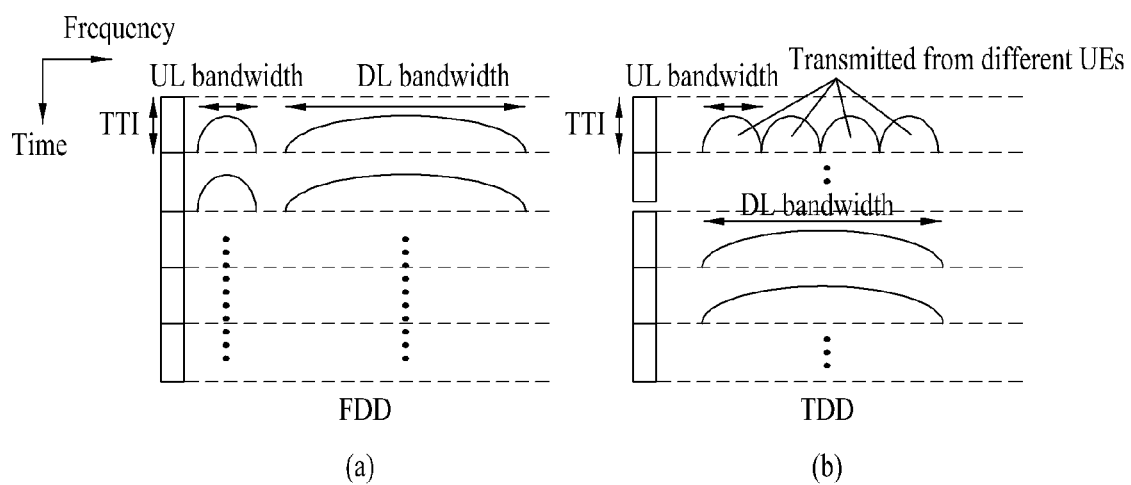
FIG. 7 illustrates exemplary uplink and downlink structures that are used in a communication system supporting multiple CCs.

FIG. 7 illustrates exemplary uplink and downlink structures that are used in a communication system supporting multiple CCs.

In a system having multiple CCs, structures of a UL (UpLink) and a DL (DownLink) may be designed in various formats. For example, in an FDD (Frequency Division Duplexing) system, the system may be designed to have the same bandwidth for both the UL and the DL. More specifically, M number of physical channels is distributed so that the UL and the DL can be assigned with the same number of physical channels. Accordingly, the UL and the DL may be designed to have a symmetric structure.

Alternatively, M number of physical channels is distributed so that the UL and the DL can be assigned with different numbers of physical channels. Such distribution allows the UL and the DL to have an asymmetric structure, so that a specific link can have a higher data yield rate. FIG. 7(a) illustrates an asymmetric structure in an FDD mode, and FIG. 7(b) illustrates an asymmetric structure in a TDD (Time Division Duplexing) mode.

Figure 8:
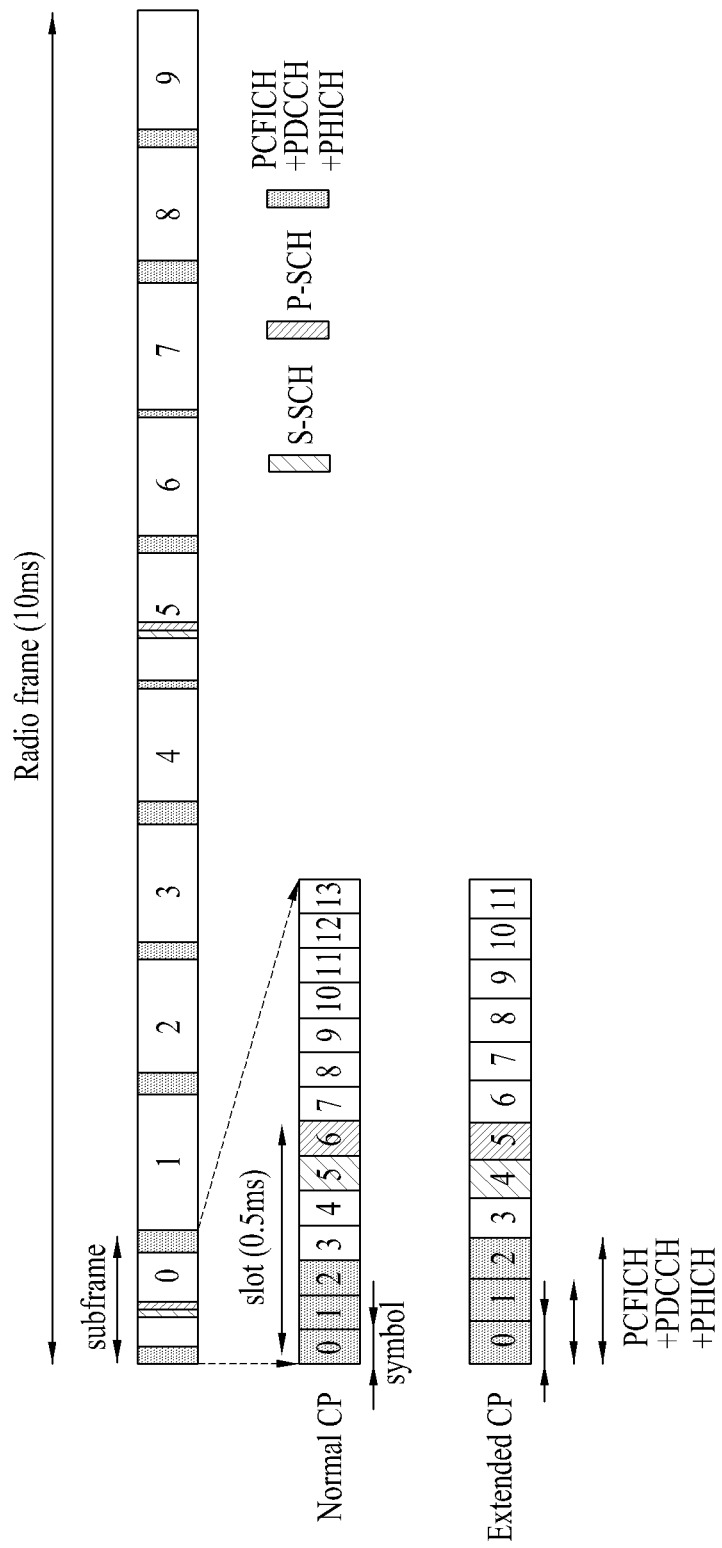
FIG. 8 illustrates an exemplary radio frame structure being used in a wireless communication system.

FIG. 8 illustrates an exemplary radio frame structure being used in a wireless communication system. Most particularly, FIG. 8 illustrates a radio frame structure and the position of a basic control channel in a 3GPP LTE system. The radio frame structure of FIG. 8 may be applied in the FDD mode, the half FDD (H-FDD) mode, and the TDD mode.

Referring to FIG. 8, a radio frame being used in the 3GPP LTE/LTE-A may have the length of 10 ms ($327200T_s$) and may include ten subframes each having the same size. Herein, $T_s$ represents a sampling time and is indicated as $T_s=1/(2048 \times 15 \text{ kHz})$. Each subframe has the length of 1ms and includes two slots. 20 slots included in one radio frame are sequentially numbered from 0 to 19. Each slot has the length of 0.5 ms. The time being consumed for transmitting one subframe is defined as a TTI (transmission time interval).

Figure 9:
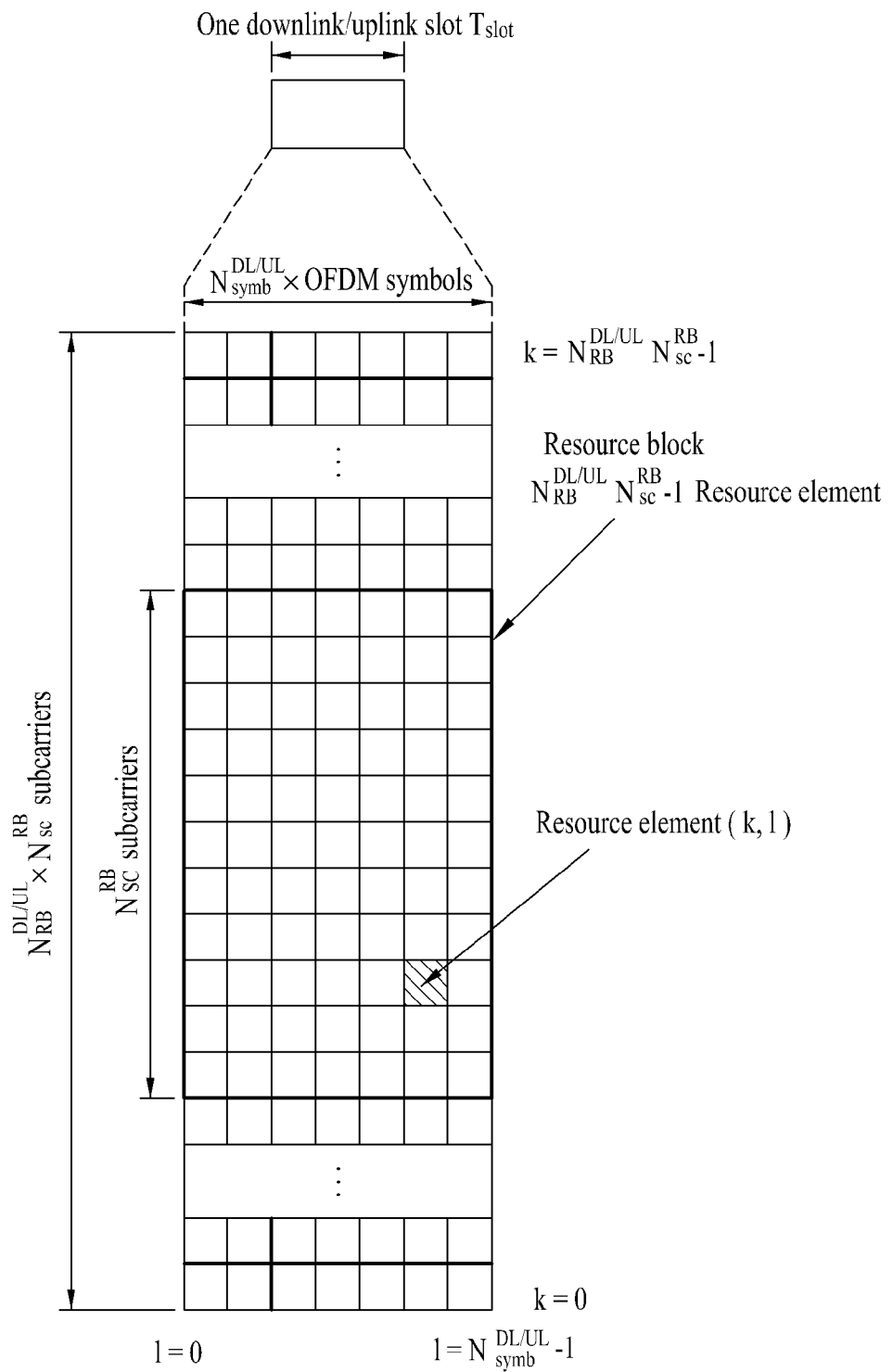
FIG. 9 illustrates an exemplary DL/UL slot structure in a wireless communication system.

FIG. 9 illustrates an exemplary DL/UL slot structure in a wireless communication system. Most particularly, FIG. 9 illustrates the structure of a resource grid of a 3GPP LTE/LTE-A system.

Referring to FIG. 9, a slot includes multiple OFDM symbols in a time domain and includes multiple resource blocks (RBs) in a frequency domain. An OFDM symbol may also signify one symbol section (or interval). One resource block includes multiple subcarriers in the frequency domain. Depending upon the multiple access method, the OFDM symbol may be referred to as an OFDM symbol, an SC-FDM symbol, and so on. The number of OFDM symbols being included in a single slot may diversely vary depending upon a channel bandwidth, a CP length, and so on. For example, in case of a normal CP, one slot may include 7 OFDM symbols. However, in case of an extended CP, one slot may include 6 OFDM symbols. In the description given with reference to FIG. 9, a subframe including slots each being configured of 7 OFDM symbols is given as an example, for simplicity. However, the exemplary embodiments of the present invention may be similarly applied to other subframes including a different number of OFDM symbols. For reference, a resource configured of one OFDM symbol and one subcarrier is referred to as a resource element (RE).

Referring to FIG. 9, a signal being transmitted from each slot may be expressed as a resource grid, which is configured of $N^{DL/UL}_{RB}N^{RB}_{sc}$ number of subcarriers and $N^{DL/UL}_{symb}$ number of OFDM or SC-FDM symbols. Herein, $N^{DL}_{RB}$ indicates a number of resource blocks (RBs) in a downlink slot, and $N^{DL}_{RB}$ indicates a number of RBs in an uplink slot. $N^{DL}_{symb}$ represents a number of OFDM or SC-FDM symbols within a downlink slot, and $N^{UL}_{symb}$ represents a number of OFDM or SC-FDM symbols within an uplink slot. And, $N^{RB}_{sc}$ indicates a number of subcarriers configuring a single RB.

In other words, a physical resource block (PRB) may be defined as $N^{DL/UL}_{symb}$ number of consecutive OFDM symbols or SC-FDM symbols in the time domain, and the PBR may be defined by $N^{RB}_{sc}$ number of consecutive subcarriers in the frequency domain. Accordingly, one PBR is configured of $N^{DL/UL}_{symb} \times N^{RB}_{sc}$ number of resource elements.

Each resource element within the resource grid may be uniquely defined by an index pair (k,l) within a slot. Herein, k corresponds to an index being assigned in the frequency domain from 0 to $N^{DL/UL}_{RB}N^{RB}_{sc}-1$, and l corresponds to an index being assigned in the time domain from 0 to $N^{DL/UL}_{symb}-1$.

Referring back to FIG. 8, a primary synchronization channel (P-SCH) and a secondary synchronization channel (S-SCH) are transmitted via downlink in each radio frame so as to realize synchronization. Additionally, a PDCCH (physical downlink control channel), which carries resource allocation information of each downlink subframe, is transmitted in a predetermined number of leading OFDM symbols within each downlink subframe. Depending upon the amount (or number) of control channels, downlink control information may be transmitted from OFDM symbol #0, OFDM symbols #0~#1, OFDM symbols #0~#2 within a downlink subframe. The number of OFDM symbols being used for the control channel transmission may be varied for each subframe. And, a PCFICH (physical control format information channel) carries information indicating the number of OFDM symbols, which are used for the control channel transmission. Accordingly, the PCFICH is transmitted in each subframe, and the PCFICH carries a total of 3 types of information. Table 1 indicates a CFI (control format indicator) of the PCFICH.

TABLE 1

| CFI | CFI codeword $<b_0, b_1, \ldots, b_{31}>$ |
|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 0> |
| 4 (reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

The CFI value indicates how many OFDM symbols have been used for the PDCCH transmission in the corresponding subframe. Referring to Table 1, when CFI=1, the PDCCH is indicated to be transmitted only in OFDM symbol #0. And, when CFI=2, the PDCCH is indicated to be transmitted in OFDM symbols #0~#1. And, when CFI=3, the PDCCH is indicated to be transmitted in OFDM symbols #0~#2.

The CFI may be defined to indicate different meanings depending upon the bandwidth. For example, when the system bandwidth is smaller than a specific threshold, the CFI values CFI=1, 2, 3 may be respectively defined to indicate that the PDCCH is being transmitted in 2, 3, 4 OFDM symbols.

Figure 10:
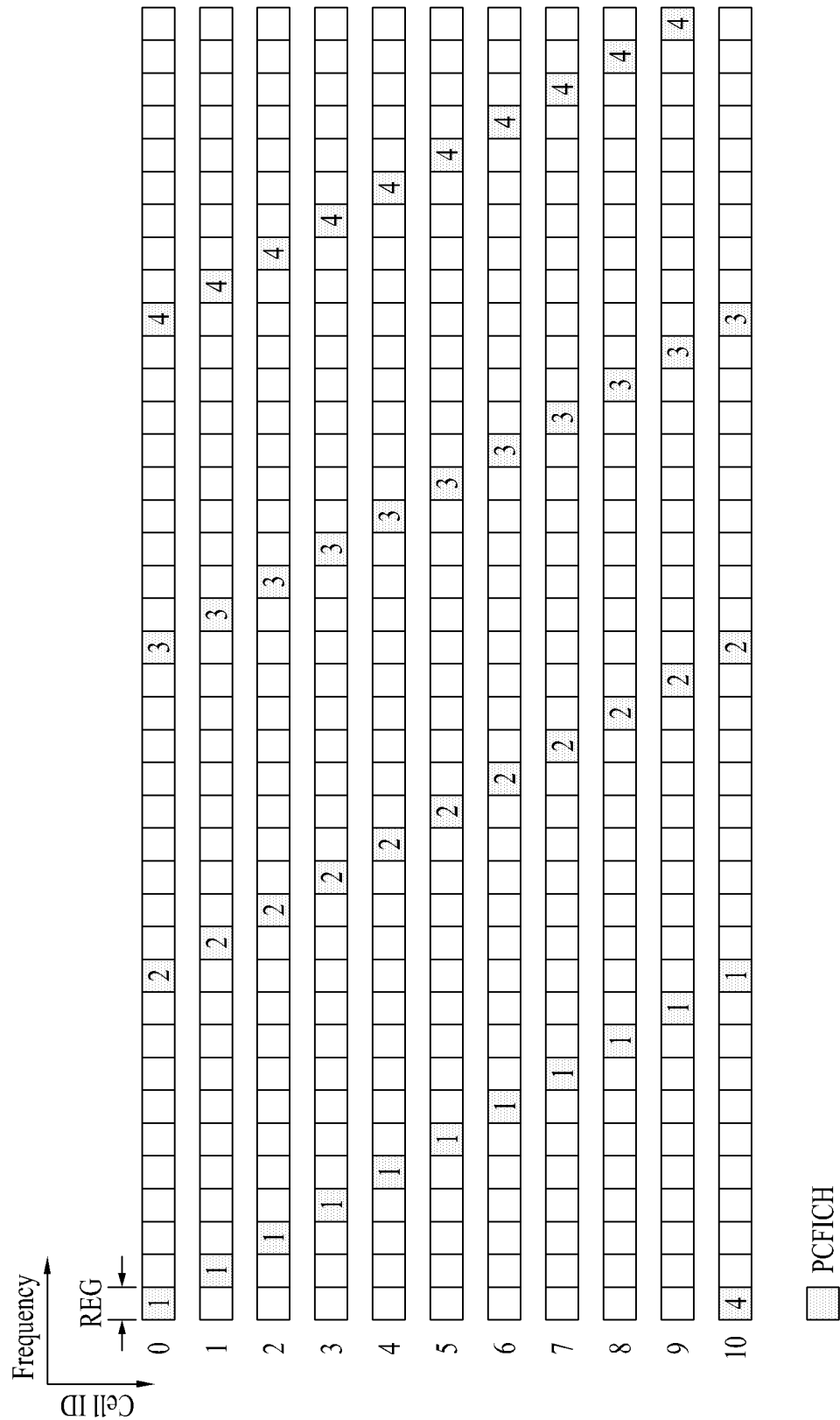
FIG. 10 illustrates an exemplary transmission of a PCFICH.

FIG. 10 illustrates an exemplary transmission of a PCFICH.

The PCFICH may be transmitted as shown in FIG. 10. Referring to FIG. 10, one REG (resource element group) includes 4 consecutive REs. The REG may be configured only of data subcarriers excluding the reference signal. And, generally, the REG is used by applying a transmit diversity method. In order to avoid inter-cell interference, the PCFICH is shifted in the frequency domain in accordance with the cell identifier. The PCFICH is transmitted only in the first OFDM symbol, i.e., only in OFDM symbol #0. Accordingly, the receiver (300a, 300b) may first detect the PCFICH, so as to perform blind detection of the PDCCH.

Figure 11:
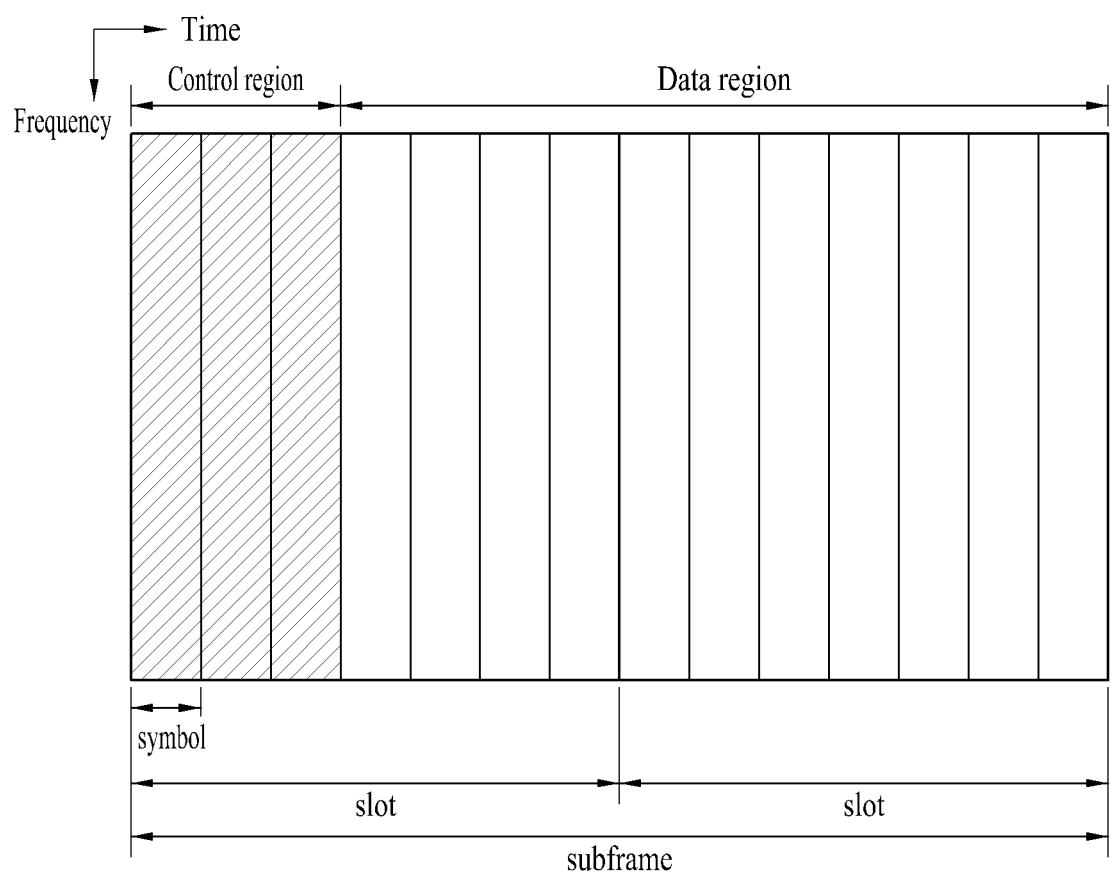
FIG. 11 illustrates an exemplary downlink subframe in a wireless communication system.

FIG. 11 illustrates an exemplary downlink subframe in a wireless communication system.

Referring to FIG. 11, each subframe may be divided into a control region and a data region. The control region starts from the first OFDM symbol and includes at least one or more OFDM symbols. The number of OFDM symbols that are being used as the control region within the subframe is transmitted through the PCFICH (Physical Control Format Indicator CHannel). The base station may transmit diverse types of control information to the user equipment(s) through the control region. In order to transmit the control information, a PDCCH (Physical Downlink Control CHannel), PCFICH, PHICH (Physical Hybrid automatic retransmit request Indicator CHannel), and so on may be assigned to the control region.

The base station may transmit data designated for the user equipment or user equipment group through the data region. Herein, the data being transmitted through the data region may also be referred to as user data. In order to transmit the user data, a PDSCH (Physical Downlink Shared CHannel) may be allocated to the data region. The user equipment may decode the control information being transmitted through the PDCCH, so as to be capable of reading the data being transmitted through the PDSCH. For example, information indicating which user equipment or user equipment group the data of the PDSCH is being transmitted to, information indicating how the user equipment or user equipment group is to receive and decode the PDSCH data, and so on may be included in the PDCCH and then transmitted.

The PDCCH carries a transport format of a DL-SCH (Downlink Shared Channel) and a resource allocation (or assignment) information, resource allocation information of a UL-SCH (Uplink Shared Channel), paging information on a PCH (paging channel), system information on the DL-SCH, allocation information of a higher layer control message, such as a random access response, which is transmitted on the PDSCH, a group of Tx power control commands for each of the UEs within a random UE group, information on a VoIP (voice over IP) activation, and so on. Multiple PDCCHs may be transmitted in the control region. The UE may monitor the multiple PDCCHs and may detect its own PDCCH. In the PDCCH, the size and purpose of the control information may vary depending upon a DCI (downlink control indicator) format, and the size may also vary depending upon the coding rate. For example, the DCI format may be defined as shown below.

TABLE 2

| DCI format | Objectives |
| --- | --- |
| 0 | Scheduling of PUSCH |
| 1 | Scheduling of one PDSCH codeword |
| 1A | Compact scheduling of one PDSCH codeword |
| 1B | Closed-loop single-rank transmission |
| 1C | Paging, RACH response and dynamic BCCH |
| 1D | MU-MIMO |
| 2 | Scheduling of rank-adapted closed-loop spatial multiplexing mode |
| 2A | Scheduling of rank-adapted open-loop spatial multiplexing mode |
| 3 | TPC commands for PUCCH and PUSCH with 2 bit power adjustments |
| 3A | TPC commands for PUCCH and PUSCH with single bit power adjustments |

The DCI format may be independently applied for each UE, and the PDCCH of multiple UEs may be multiplexed in one subframe. The PDCCH of each UE may be independently channel-coded so that a CRC (cyclic redundancy check) can be added to the respective PDCCH. The CRC is masked with a unique identifier of each UE so that each UE can receive its respective PDDCH. However, since the UE is essentially unaware of the position to which its PDCCH is being transmitted, the UE is required to perform blind detection on all of the PDCCHs of the corresponding DCI format, until the UE receives the PDCCH having the identifier of the corresponding UE.

Hereinafter, in the description of the present invention, the transmission of data for a UE may be expressed as a PDSCH transmission, and the transmission of control information related to the data may be expressed as a PDCCH transmission, for simplicity.

Figure 12:
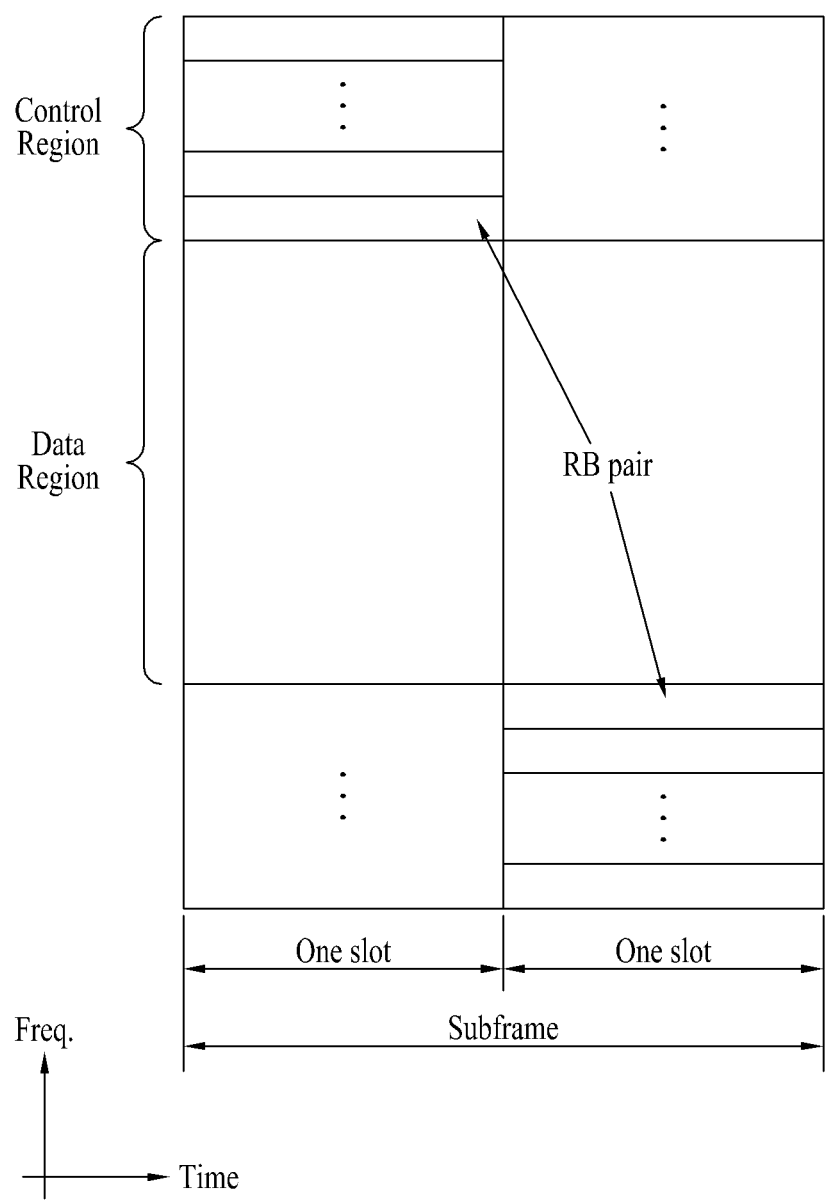
FIG. 12 illustrates an exemplary uplink subframe in a wireless communication system.

FIG. 12 illustrates an exemplary uplink subframe in a wireless communication system.

Referring to FIG. 12, an uplink subframe may be divided into a control region and a data region in the frequency domain. In order to carry UCI (uplink control information), one or more PUCCHs (physical uplink channels) may be allocated to the control region. In order to carry user data, one or more PUSCHs (physical uplink shared channels) may be allocated to the data region. When the UE adopts the SC-FDMA scheme for the uplink transmission, in order to maintain the single carrier characteristic, the PUCCH and the PUSCH cannot be transmitted simultaneously. The PUCCH for one UE may be allocated to an RB pair within the subframe, and the RBs belonging to the RB pair may each occupy a different subcarrier within two slots. Herein, it may be expressed that an RB pair allocated to the PUCCH performs frequency-hopping at a slot boundary of the PUCCH being allocated as described above.

Meanwhile, when a single UE uses multiple carriers, downlink control information may be configured to have diverse formats. This will hereinafter be described in detail with reference to FIG. 13.

Figure 13:
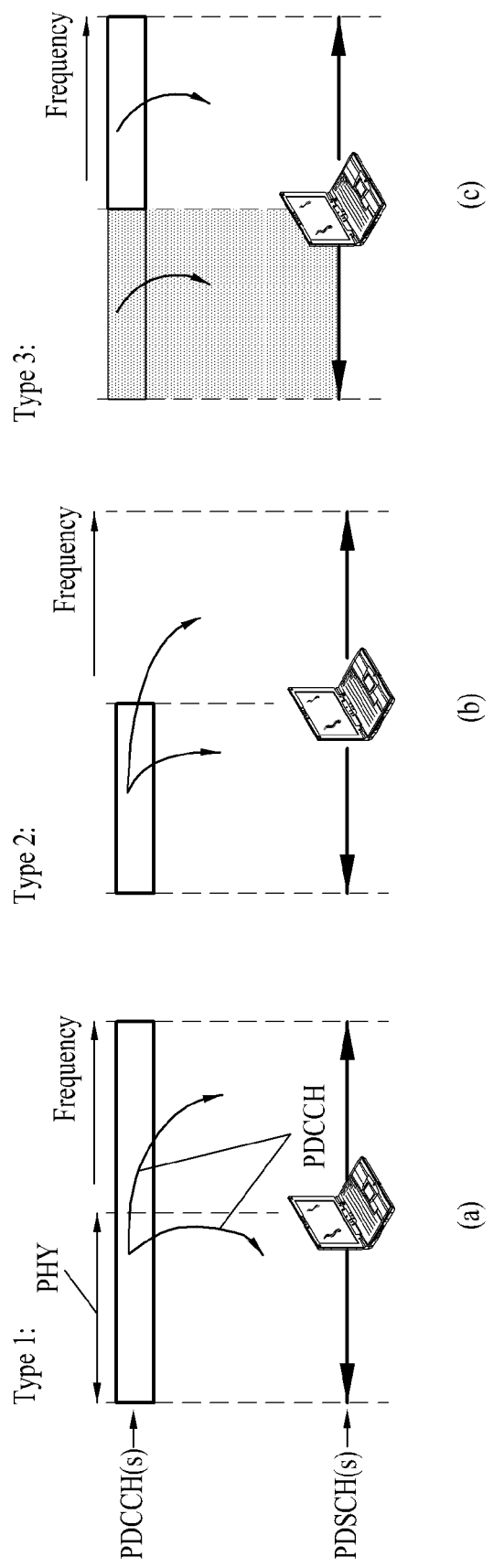
FIG. 13 illustrates diverse methods for allocating a downlink control channel in a system using multiple carriers.

FIG. 13 illustrates diverse methods for allocating a downlink control channel in a system using multiple carriers.

FIG. 13(a) illustrates a Type 1 method among diverse methods for allocating downlink control channels to the UE. Referring to FIG. 13(a), the base station may transmit information on downlink data being transmitted on multiple carriers to the UE by using the PDCCH region of multiple carriers. In case of the Type 1 method, since the control information on the downlink is transmitted by being spread to several carriers, the PDCCH may gain a diversity gain. However, in case the channel status of a specific physical channel is poor, there may be a case when the data cannot be received.

FIG. 13(b) illustrates a Type 2 method among diverse methods for allocating downlink control channels to the UE. Referring to FIG. 13(b), in case the base station allocates several downlink carriers to the UE, the PDCCH may be transmitted only on a specific carrier. In case of the Type 2 method, it is advantageous in that the amount of downlink control information may be minimized. However, in case the channel status of a specific physical channel is poor, it may be difficult to also receive the PDSCH data being transmitted on other carriers.

FIG. 13(c) illustrates a Type 3 method among diverse methods for allocating downlink control channels to the UE. Referring to FIG. 13(c), in case the UE is allocated with L number of carriers, as a method for receiving data by using the L number of PDCCHs, the Type 3 method corresponds to a method of using an independent PDCCH for each carrier. In the Type 3 method, each carrier independently carries PDCCH, and thus the Type 3 method provides the highest flexiblity, and, even if the channel status of a specific channel is poor, data transmission may be performed on other carriers. Therefore, the Type 3 has the highest robustness associated with the channel environment. However, since some control information may be repeatedly transmitted in each carrier, it may be disadvantageous in that unnecessary overhead may occur.

The processor (400b) of the base station according to the present invention may allocate a downlink control signal in accordance with any one of the Type 1 method, the Type 2 method, and the Type 3 method. Under the control of the base station processor (400b), the transmitter (100a) of the base station may transmit the downlink control signal through the corresponding carrier. The receiver (300a) of the user equipment according to the present invention may receive the downlink control signal and user data being transmitted through one or more carriers. Based upon the downlink control signal, which is received by the user equipment receiver (300a), the processor (400a) of the user equipment may control the user equipment receiver (300a) to receive user data on a carrier carrying the downlink control signal or on another carrier.

Figure 14:
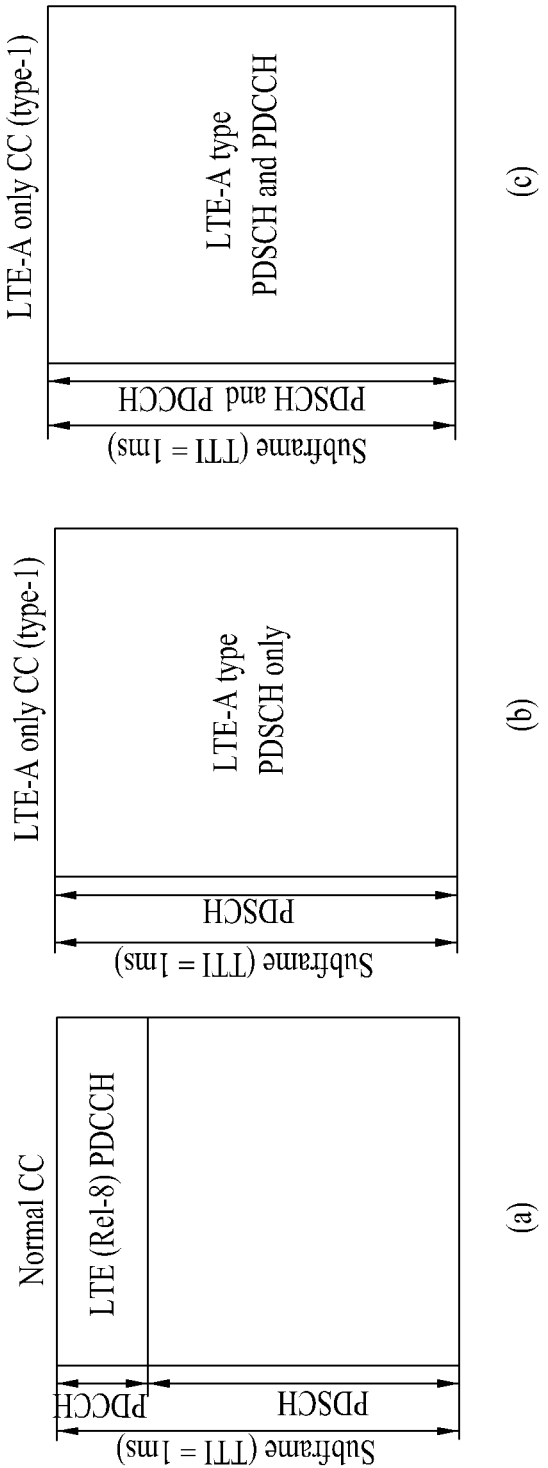
FIG. 14 illustrates exemplary subframe structures for each carrier in a multi-carrier system.

FIG. 14 illustrates exemplary subframe structures for each carrier in a multi-carrier system.

Referring to FIG. 14(a), among multiple carriers, one CC may be configured to have a format that can be used by an LTE UE. If a CC that can be operated by an LTE UE is referred to as a normal CC, the normal CC may be configured in accordance with the 3GPP LTE standard. According to the 3GPP LTE standard, since one subframe includes both PDCCH and PDSCH, the normal CC may be allocated with the PDCCH and the PDSCH at each downlink subframe.

Referring to FIG. 14(b), among multiple carriers, one CC may be configured to have a format that can be used only by an LTE-A UE, and the CC may also be configured to carry only the PDSCH. When the control channel is allocated in accordance with the Type 2 method among the methods for allocating a control channel, which is described above with reference to FIG. 13, a carrier carrying only the PDSCH may be configured.

Referring to FIG. 14(c), among multiple carriers, one CC may be configured to have a format that can be used only by an LTE-A UE, and the CC may also be configured to carry both the PDCCH and the PDSCH. According to the methods for allocating the control channels, as described above with reference to FIG. 13, among the multiple carriers, a predetermined CC may be configured to carry both the PDCCH and the PDSCH.

At this point, the PDCCH and the PDSCH being transmitted on the CC, which can be used only by the LTE-A UE correspond to channels that are configured in accordance with the 3GPP LTE-A standard. Accordingly, the LTE-A UE dedicated PDCCH and PDSCH may be configured to have different formats as compared to the formats of the conventional PDCCH and PDSCH, which are being transmitted from a normal CC. Alternatively, the allocation positions of the corresponding PDCCH and PDSCH within the subframe may be different from those of the positions to which the conventional PDCCH and PDSCH are allocated. More specifically, the LTE-A UE dedicated PDCCH and PDSCH may be positioned in the corresponding subframe in a format different from the LTE UE dedicated PDCCH and PDSCH, which is described above with reference to FIG. 11.

In case multiple carriers are being used, the method for configuring the system may vary depending upon the carrier. For example, the three different types of CCs, which are described above with reference to FIG. 14(a) to FIG. 14(c), may all be configured in the downlink, or a different CC format other than the three types may be configured. Alternatively, only some of the above-described three CC formats may be configured.

The processor (400b) of the base station according to the present invention may configure multiple carriers for a predetermined user equipment. The base station processor (400b) may configure each carrier in accordance with any one of the formats shown in FIG. 14(a) to FIG. 14(c). Based upon the control of the base station processor (400b), the transmitter (100b) of the base station may transmit the multiple carriers, which are configured as described above, to the user equipment.

In case the user equipment is an LTE UE, the processor (400a) of the LTE UE may control the receiver (300a) of the LTE UE, so as to receive only the CC that is configured in the format shown in FIG. 14(a). In case the user equipment is an LTE-A UE, the processor (400a) of the LTE UE may control the receiver (300a) of the LTE UE, so as to receive only the CC that is configured in the format shown in FIG. 14(a).

Meanwhile, in the multiple carrier system, the design of a control channel based upon the frequency channel characteristic of each carrier causes a large influence on the system optimization. Therefore, in order to realize system optimization, it is important to adequately use an optimal transmission/reception method and a system parameter for each carrier. Additionally, when a carrier is configured to have the same frame structure as a specific conventional system, e.g., a frame structure for the 3GPP LTE standard, it is required to adequately modify the control channel so as to acquire backward compatibility, which allows both the UE for the conventional system and the UE for the new system to be operated.

Hereinafter, in a system using multiple carriers/physical channels, an optimization method for a frequency band of each carrier/physical channel, a method for enhancing system performance through collaboration between carriers/physical channels, a method for multiplexing multiple control channels for controlling multiple carriers/physical channels, a method for allocating the same to an optimal carrier/physical channel, and so on will be described. Additionally, physical channels of a downlink and an uplink described an efficient control channel structure for another FDD mode. Hereinafter, under the assumption that one physical channel is assigned to one carrier, the present invention will be described in the viewpoint of the carrier. Nevertheless, the present invention may also be applied to a case when multiple physical channels are assigned to a single carrier. For example, the exemplary embodiments of the present invention, which will be described later on in detail, may be applied herein regardless of which carrier a physical channel belongs to.

Alternatively, the exemplary embodiments of the present invention may also be applied based upon the carriers. More specifically, when several carriers having at least one or more physical channels exist, the present invention may be applied in the viewpoint of the carrier. In this case, the term carrier, which is used in the following description of the present invention, may be replaced with the term physical channel, thereby being applied to the exemplary embodiments of the present invention.

<Downlink Control Signaling>

When multiple CCs are used in the transmission of downlink control information for notifying information on the downlink data transmission, the UE is required to be capable of receiving a number of PDCCH corresponding to the number of the respective CCs. The base station may transmit multiple PDCCHs assigned to multiple carriers in accordance with several types, as shown in FIG. 13. Referring to FIG. 13, most particularly, the Type 1 method and the Type 2 method correspond to the methods that can collectively transmit diverse downlink control information for a specific UE. Hereinafter, the grouping of multiple PDCCHs for a single UE will be referred to as multi-PDCCH, for simplicity. Additionally, the grouping of multiple PUCCHs for an uplink will be referred to as multi-PUCCH.

Herein, multi-PUCCH may be broadly configured by joint coding or separate coding.

In configuring the multi-PDCCH, the base station may simultaneously perform channel coding on the control information for the downlink data of all carriers, so as to perform joint coding. When performing joint coding, since one centralized PDCCH includes information on all downlink data transmission, the UE should first receive the centralized PDCCH so as to be capable of receiving the downlink data being transmitted through multiple carriers.

The base station may use a separate coding method so as to transmit information on multiple PDCCHs to the UE. The base station may use the separate coding method so as to configure multi-PDCCH. For example, the base station may encode each of the PDCCH for the data of each carrier, and the base station may then perform packing on each of the encoded PDCCHs, so as to configure the multi-PDCCH. More specifically, by coding several PDCCHs and by grouping the separately coded PDCCHs, multi-PDCCH may be transmitted to the UE through a specific resource area.

Multi-PDCCH that is aggregated by using the joint coding method, or by using the separate coding method may transmit the PDCCH region on at least one carrier to the UE, as shown in FIG. 13(a) and FIG. 13(b).

The multi-PDCCH may be transmitted in the Type 1 format or the Type 2 format, as described in FIG. 13. At this point, although it is preferable that each PDCCH of the multi-PDCCH is coded by a single channel encoder, each PDDCH may also be coded by a respective channel encoder. However, the CRC being configured to verify errors may be added for each PDCCH, and may also be added for each multi-PDCCH. The CRC may also be dually added to each individual PDCCH and to the multi-PDCCH. In case of adding the CRC to each of the PDCCHs and to the multi-PDCCH, the length of the CRC may vary accordingly.

Meanwhile, in order to configure the multi-PDCCH by using multiple PDCCHs, information indicating to which CC the PDCCH corresponds is required to be provided. In order to do so, CRC masking of a specific pattern may be applied to each PDCCH. In this case, the UE may use a CRC masking pattern, which is applied to each PDCCH, so as to determine to which CC the corresponding PDCCH belongs.

Figure 15:
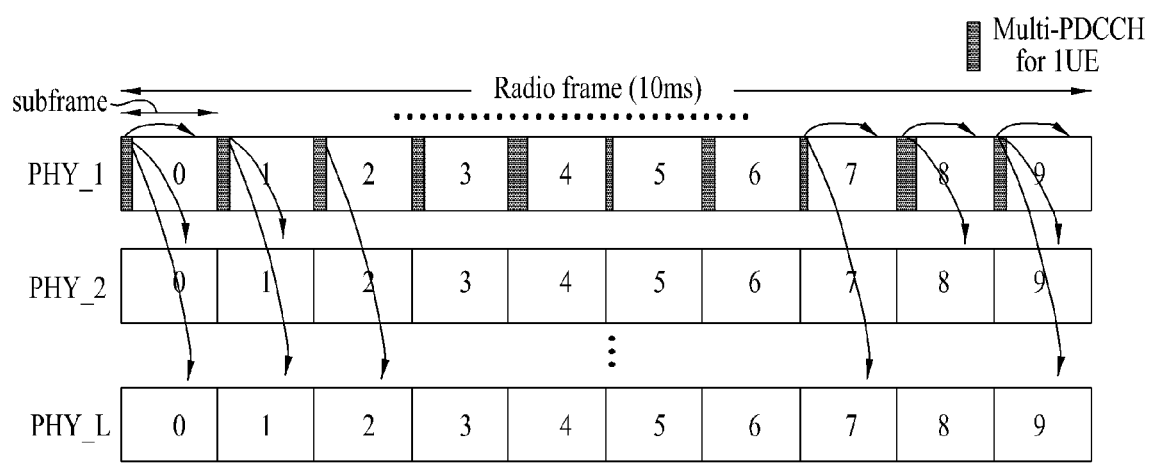
FIG. 15 illustrates an example of a multi-PDCCH being transmitted from the multi-carrier system.

FIG. 15 illustrates an example of a multi-PDCCH being transmitted from the multi-carrier system. Most particularly, FIG. 15 illustrates a method of transmitting multi-PDCCH b using the Type 2 method shown in FIG. 13.

Referring to FIG. 15, according to the Type 2 method, the downlink control information may be transmitted only through a specific carrier, e.g., CC_1 channel. In this case, control channels are not allocated to the subframes over CC_2 to CC_L. Referring to FIG. 14, a subframe over CC_1 is configured as shown in FIG. 14(a) or FIG. 14(c), and the subframes over CC_2 to CC_L are configured as shown in FIG. 14(b).

Meanwhile, when downlink control information is being transmitted as in the Type 1 method of FIG. 13, each multi-PDCCH may be transmitted through all carriers, or each multi-PDCCH may be transmitted through multiple carriers.

According to the Type 1 method or the Type 2 method of FIG. 13, the multi-PDCCH for one LTE-A UE may be transmitted from a carrier other than the carrier through which the actual PDSCH is being transmitted. In this case, in order to allow the UE to receive/detect its own downlink data, the system requires information indicating the CC, over which the downlink data is being transmitted, that is related to the multiple PDCCHs included in the multi-PDCCH. Hereinafter, the present invention will be described in detail while referring to such information as CC indication information. The base station may use a specific bit field of the PDCCH so as to notify the CC indication information to the UE in n-bits. Alternatively, by masking the PDCCH with a CRC specified for each CC, the base station may configure the multi-PDCCH. In this case, by de-masking the PDCCHs included in the multi-PDCCH with the CRC, the UE may be aware of the physical channel associated with each PDCCH.

When four downlink CCs are being used, the CC information may, for example, be defined as shown in the following Table.

TABLE 3

| CC Indication Bit Field (CIBF) | Carrier Number |
|---|---|
| 00 | $1^{st}$ CC (Component Carrier 1) |
| 01 | $2^{nd}$ CC (Component Carrier 2) |
| 10 | $3^{rd}$ CC (Component Carrier 3) |
| 11 | $4^{th}$ CC (Component Carrier 4) |

When the number of CCs is not equal to 4, it will be apparent that a CIBF bit having a different size may be defined and used. Additionally, in case the number of uplink CCs is different from the number of downlink CCs, the size of the CIBF for the downlink transmission and the size of the CIBF for the uplink transmission may be different from one another. Hereinafter, the CIBF for the downlink transmission will be referred to as a DL-CIBF, and the CIBF for the uplink transmission will be referred to as a UL-CIBF.

Referring to Table 3, when multiple CCs are being used, the CIBF should be applied to all PDCCHs. When only one CC is being used, the base station may reserve (or postpone) the usage of the CIBF and then transmit null information or default value prearranged between the base station and the UE to the UE. Alternatively, the corresponding bit of the CIBF may be used for the transmission of other information. The CIBF may be removed, and the CIBF may not be transmitted at all.

Meanwhile, the number of bits in the CIBF may vary depending upon the LTE-A UE. More specifically, since the number of CCs that can be used by each UE may vary, the CIBF may vary depending upon the UE. When the number of bits included in the CIBF depends upon the number of CCs, the number of CCs or the number of bits included in the CIBF may be notified to the UE through RRC (Radio Resource Control) signaling.

Alternatively, the number of bits included in the CIBF may also be defined in a pre-defined format. For example, among the LTE-A UEs, the number of bits of the CIBF may be defined based upon a UE supporting the most number of CCs. More specifically, when the number of CCs that can be supported by the UE, which supports the most number of CC within the LTE-A system, is referred to as $CC_{max}$, the number of bits included in the CIBF may be predefined as floor$\{\log_2(CC_{max})\}$.

The base station processor (400*b*) may allocate the PDCCH and the corresponding PDSCH to the CC, and the base station processor (400*b*) may generate CC indication information indicating the CC through which the PDSCH is being transmitted. The base station processor (400*b*) may generate the PDCCH so that the CC indication information is included in the PDCCH. Alternatively, the CC indication information may be generated in the form of RRC signaling signals. Under the control of the base station processor (400*b*), the base station transmitter (100*b*) may transmit the CC indication information to the user equipment. The receiver (300*a*) of the user equipment may receive the PDCCH and the CC indication information, and the processor (100*a*) of the user equipment may be aware of the CC from which the PDSCH, which is associated with the PDCCH, is being transmitted based upon the CC indication information. The processor (100*a*) of the user equipment may control the user equipment receiver (300*a*) to receive the PDSCH from the corresponding CC based upon the PDCCH.

Figure 16:
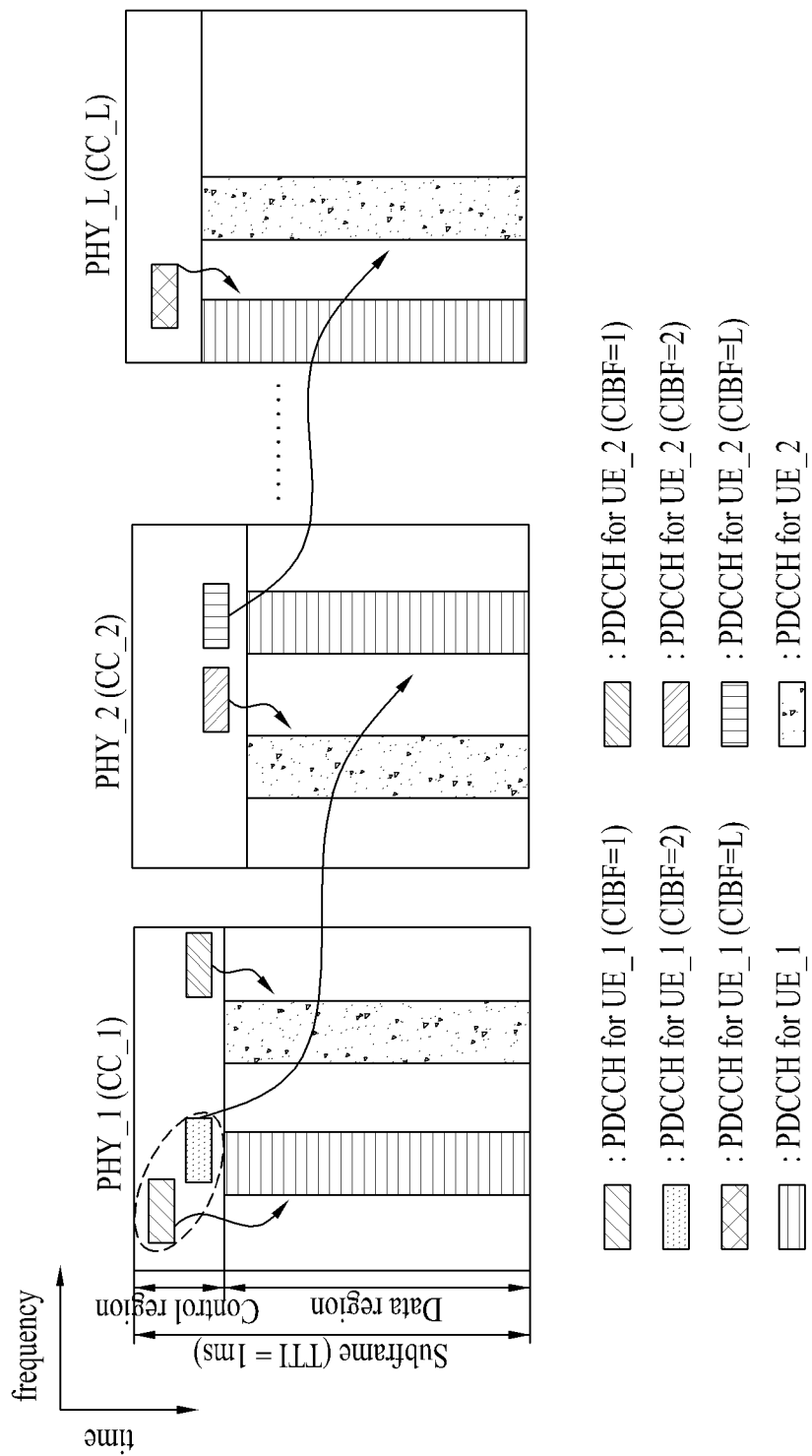
FIG. 16 illustrates an exemplary multi-PDCCH transmission from the multi-carrier system.

FIG. 16 illustrates an exemplary multi-PDCCH transmission from the multi-carrier system. Most particularly, FIG. 16 shows an exemplary transmission of downlink control information in accordance with the Type 1 method of FIG. 13.

Referring to FIG. 16, in order to transmit the multi-PDCCH, the base station may configure a CC subset and transmit the configured CC subset to the UE. For example, in case L number of CCs is being used in the downlink, the base station may transmit PDCCH or multi-PDCCH for a specific UE, e.g., UE_1, only during the pre-defined N number of CC subsets (wherein N<L). UE_1 may be configured to receive the PDCCH or multi-PDCCH during the N number of CC subsets. According to this embodiment of the present invention, since the UE_1 is only required to perform blind detection during the N number of CC subsets, the number of CCs being required by the corresponding UE to attempt decoding is reduced as compared to the case of performing blind detection on all L number of CCs. Accordingly, by decreasing the complexity of the blind detection process, the data reception performance of the UE may be enhanced. At this point, the base station may disperse each of the multiple PDCCHs for the UE_1, so as to allow the dispersed PDCCHs to be transmitted to the UE_1 through specific CC within the CC subset, e.g., CC_1 and CC_L. The CC subset that should be received by each UE may be pre-decided via RRC signaling, or may be decided based upon a pre-defined rule.

The base station processor (400*b*) may transmit user data to a UE through multiple carriers, e.g., L number of carriers. At this point, the base station processor (400*b*) may allocate the PDCCH designated for the UE only during the N (wherein N<L) number of CC subsets defined herein. The transmitter (100*b*) of the base station may transmit a control signal for the user data, which are transmitted over the L number of carriers, based upon the control of the base station processor (400*b*), over N number of CCs within the CC subset. The processor (400*a*) of the UE may perform blind detection on the N number of CCs within the CC subset, so as to control the user equipment receiver (300*a*) so that the user equipment receiver (300*a*) can receive the control signal. Additionally, the user equipment processor (400*a*) may control the user equipment receiver (300*a*), so that the user equipment receiver can receive the user data, being transmitted over the L number of CCs, based upon the control signal.

Meanwhile, other CC, on which the PDCCH or multi-PDCCH of the UE_1 are not transmitted, may be used for the transmission of the PDCCH or multi-PDCCH of another UE, e.g., UE_2. The PDCCH or multi-PDCCH of another UE, e.g., UE_2, may also be transmitted on a CC included in the CC subset designated for the UE_1.

<PDSCH Dedicated CC>

According to the Type 2 method of FIG. 13, the base station may use the CC indication information so as to transmit the PDCCH on another CC, instead of transmitting the PDCCH on the CC transmitting the PDSCH. More specifically, the base station may configure a CC that does not carry the PDCCH. However, the base station cannot configure only the CCs carrying only the PDSCH. Therefore, in order to allow the base station to use the CC carrying only the PDSCH, the base station is required to also configure the CC carrying the PDCCH. A CC that is configured to carry only the PDSCH without any PDCCH is referred to as a PDSCH dedicated CC.

Figure 17:
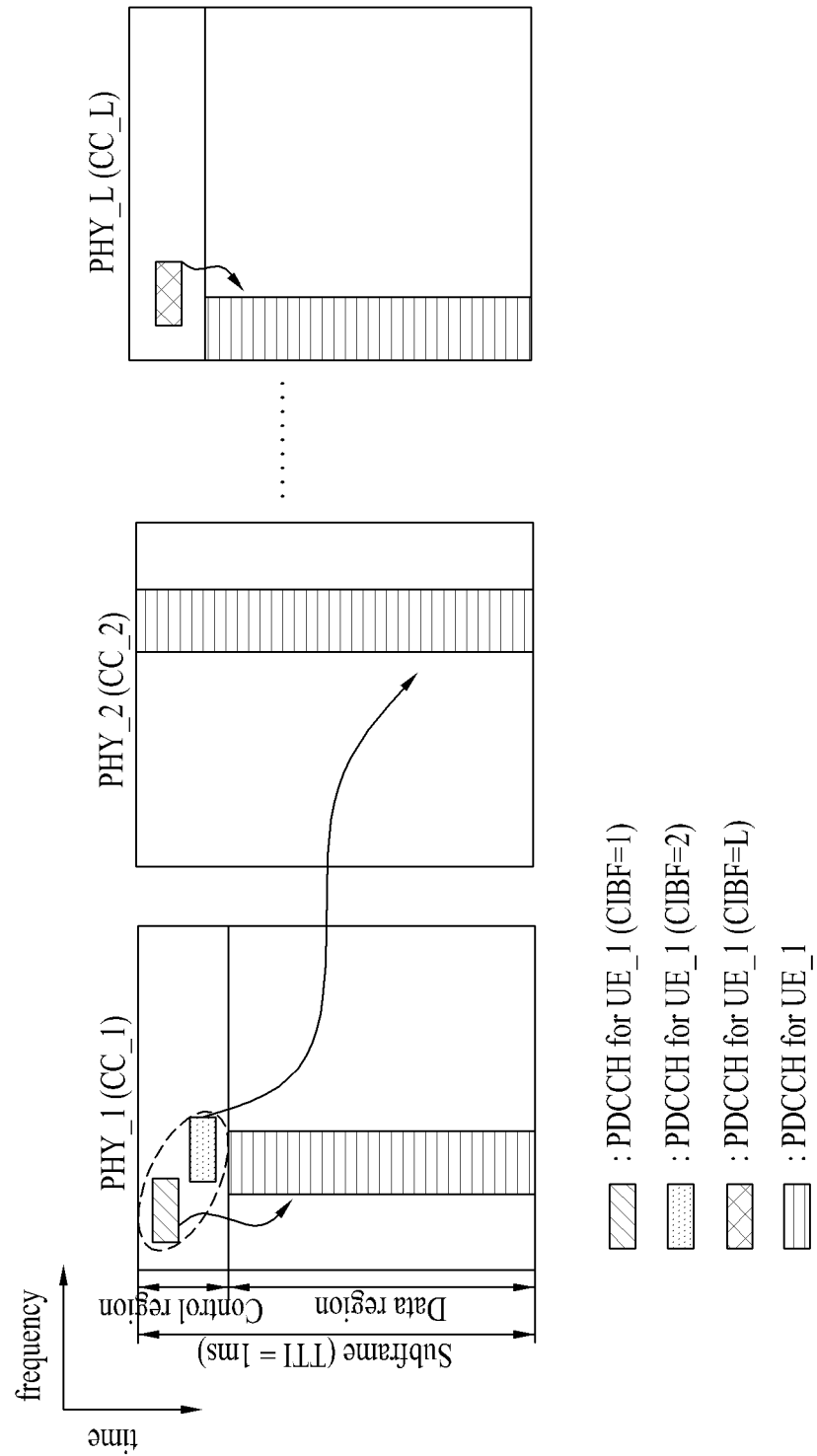
FIG. 17 illustrates another exemplary multi-PDCCH transmission from the multi-carrier system.

FIG. 17 illustrates another exemplary multi-PDCCH transmission from the multi-carrier system. Most particularly, FIG. 17 shows an exemplary transmission of downlink control information in accordance with the Type 2 method of FIG. 13.

Referring to FIG. 17, the base station may transmit the PDSCH for UE_1 through CC_1 and CC_2, CC_L, and the base station may transmit the PDCCHs for the PDSCH through the CC_1 and CC_L. As a result, the base station transmits only the PDSCH in CC_2. Accordingly, CC_2 corresponds to the PDSCH dedicated CC. The UE_1 acquires the PDDCHs designated for the UE_1 from the CC_1 and CC_L, and the UE_1 may acquire the PDCCH being transmitted through the CC_1 and CC_2, CC_L channels based upon the PDCCHs. For example, the UE_1 may detect the PDSCH being transmitted through the CC_2 based upon the PDCCH, which is transmitted through the CC_1 channel. Meanwhile, the UE_1 may be configured not to perform blind detection for detecting its own PDSCCH on the CC_2 configured to carry only the PDSCH.

The base station processor (400*b*) may allocate only the PDSCH to a predetermined CC without any PDCCH. However, the PDCCH for the PDSCH is allocated to another CC. The transmitter (100*b*) of the base station may transmit the PDSCH designated for a UE through a certain CC based upon the control of the base station processor (400*b*), and the transmitter (100*b*) of the base station may also transmit the PDCCH for the PDSCH through a CC other than the certain CC. The UE may receive the PDCCH through the receiver (300*a*), and the UE may also receive the PDSCH, which is transmitted through the certain CC. The processor (400*a*) of the UE may control the receiver (300*a*) so that the receiver (300*a*) cannot perform blind detection, which is performed to detect the PDCCH, over the certain CC. The processor (400*a*) may control the receiver (300*a*) so that the blind detection process can be performed in a CC other than the PDSCH dedicated CC. Based upon the PDCCH, which is detected through the blind detection, the processor (400a) may control the receiver (300a) so that the receiver (300a) can receive the PDSCH, which is transmitted through the certain CC.

<Subframe Offset>

1. Subframe Offset for PDSCH Dedicated CC

Figure 18:
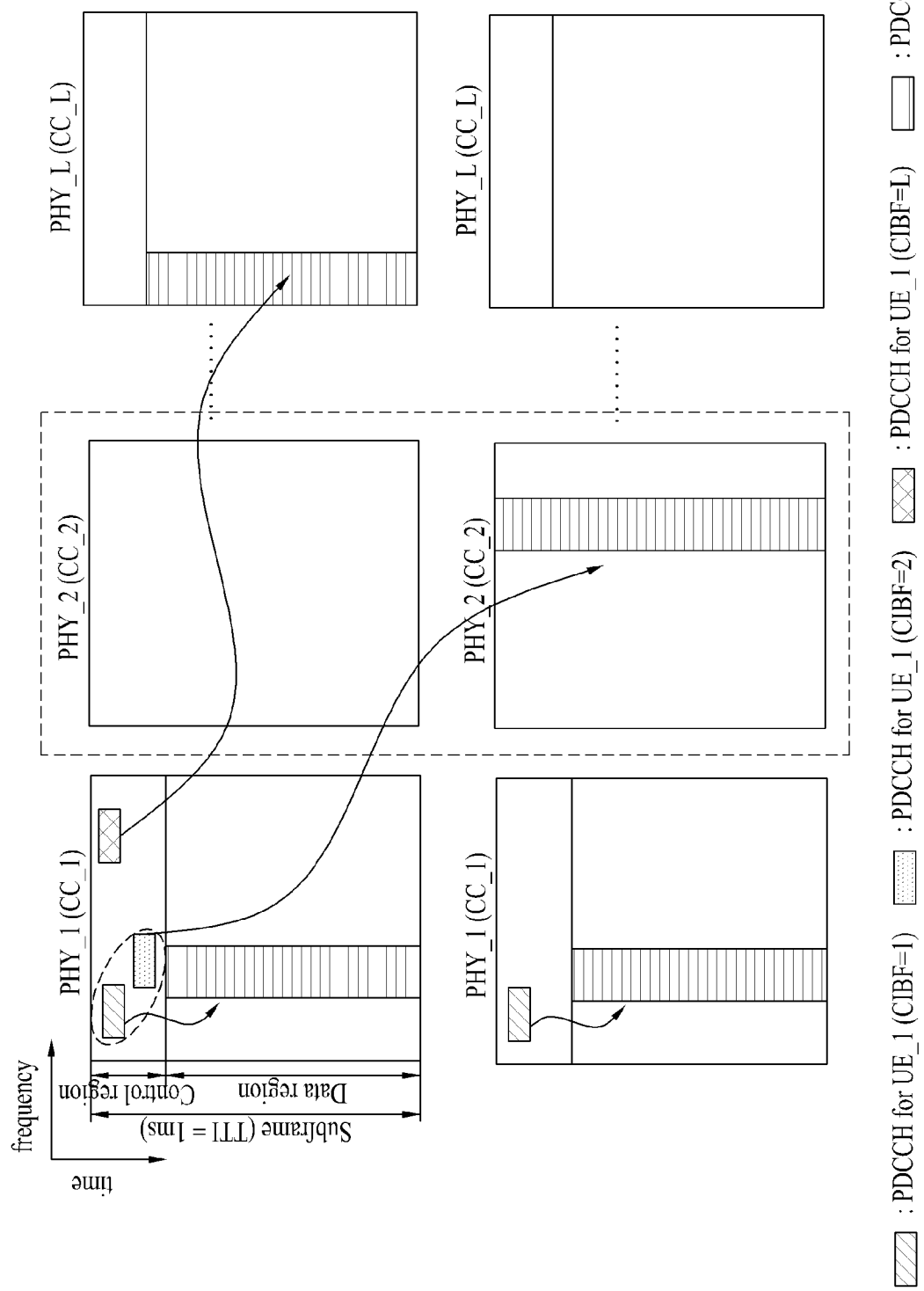
FIG. 18 illustrates yet another exemplary multi-PDCCH transmission from the multi-carrier system.

FIG. 18 illustrates yet another exemplary multi-PDCCH transmission from the multi-carrier system. Most particularly, FIG. 18 shows an example of applying the transmission of downlink control information in accordance with the Type 2 method of FIG. 13 over multiple subframes.

In case of a PDSCH dedicated CC, through which the PDCCH is not transmitted, a PDCCH being associated with the PDSCH that is being transmitted from the PDSCH dedicated CC is transmitted through another CC. At this point, it is preferable that the PDCCH is transmitted in subframe(s) that is earlier than a subframe in which the PDSCH is transmitted. The PDCCH should at least be transmitted in a subframe identical to the subframe in which the PDSCH is transmitted. More specifically, when a subframe offset, which corresponds to a difference between the subframe in which the PDSCH is transmitted and the subframe in which the PDCCH is transmitted, is referred to as k, k is given a value equal to or greater than 0. This may be expressed as the following equation.

$$k = \text{subframe}_{PDSCH} - \text{subframe}_{PDCCH} \geq 0 \qquad \text{Equation 1}$$

Herein, subframe$_{PDSCH}$ represents the number of a subframe in which the PDSCH is transmitted, and subframe$_{PDCCH}$ represents the number of a subframe in which the PDCCH for the PDSCH is transmitted.

Meanwhile, in the conventional system using a single CC, the PDSCH is transmitted after the PDCCH is transmitted. Therefore, the UE may acquire its own PDCCH by performing blind detection, and, then, the UE may receive the corresponding PDSCH within the subsequent data region. Therefore, while the PDCCH is being received, buffering is not required to be performed on the related PDSCH. However, in case the PDCCH and the corresponding PDSCH are being transmitted in the same subframe, during the time duration for detecting the PDCCH, the UE should perform buffering on the PDSCH being transmitted through another CC. For example, referring to FIG. 17, it will be assumed that the base station transmits the PDCCH designated for the UE_1 through CC_1 in the first three symbols of a subframe, and that the base station transmits the PDSCH designated for the UE_1 through the CC_2 in the subframe. In this case, the UE_1 may perform blind detection of the PDCCH(s) designated for the UE_1 with respect to CC_1 over the first three symbols of the subframe. In the first three symbols, the PDCCH is transmitted, and the PDSCH is also transmitted through CC_2. However, even if the UE_1 receives the PDSCH through the CC_2 during the first three symbols section, since the UE_1 has not yet acquired its own PDCCH, a problem may occur in that the PDSCH, which is transmitted in duration of the first three symbols, cannot be decoded. Accordingly, in order to resolve such problem, the UE_1 performs buffering on the signals that are being transmitted through the PDSCH dedicated CC during the symbol section, through which the PDCCH(s) designated for the UE_1 is/are transmitted. During the symbol section for performing blind detection on the PDCCH, in order to perform buffering on the data being transmitted through the PDSCH dedicated CC, each UE may use a portion of the memory (200a) as the buffer. When the UE acquires its own PDCCH after performing the blind detection process, the UE may decode the corresponding PDSCH including the buffered data based upon the acquired PDCCH. However, the process of implementing a UE performing buffering is more complicated than the process of implementing a UE that does not perform buffering. Additionally, in order to allow the UE to perform such buffering process, a predetermined capacity of the memory (200a) should be reserved for the buffering process. Therefore, it will be preferable to define the value k to have a value greater than 0, so that the degree of implementation complexity of the UE caused by the buffering process can be reduced. This may be expressed as the equation shown below.

$$k = \text{subframe}_{PDSCH} - \text{subframe}_{PDCCH} \geq 1 \qquad \text{Equation 2}$$

Herein, k may be understood as a value for deciding the subframe in which the PDCCH for a specific PDSCH is transmitted. Inversely, the value k may also be understood as a value for designating a subframe in which a PDSCH associated to the PDCCH is transmitted. At this point, k may be configured as a fixed value, or k may be differently configured for each UE so as to be transmitted to the respective UE through the corresponding PDCCH or RRC.

Meanwhile, it is preferable that k is given a small value, e.g., 1 or 2. When k is given a greater value, this indicates that a difference in the transmission time between the PDCCH and the corresponding PDSCH. In this case, a change may occur in the channel status of the corresponding CC, which is based upon a scheduling of the PDSCH. Thus, the scheduling information of the PDSCH, which is being transmitted through the PDCCH, may no longer be valid. Therefore, based upon the time variability of the channel status, it will be preferable to define the value k to have a value less than or equal to a predetermined value.

The base station may transmit a PDCCH and its respective PDSCH, so that k can have a value greater than or equal to 1 and have a value less than or equal to a predetermined value. In case k is not assigned with a fixed value, the base station may transmit the value k to the UE through the PDCCH or RRC signaling.

Hereinafter, the present invention will be described in detail under the assumption that, among the L number of CCs that can be used by the UE_1, only 3(three) CCs, e.g., CC_1 and CC_2, CC_L are activated. Referring to FIG. 18, the base station transmits the user data for UE_1 over CC_1 and CC_2, CC_L, and the base station may transmit control information for the user data through the CC_1. At this point, on CC_2, the base station transmits the user data after k number of subframes from subframe N, through which the control information is transmitted. In other words, the base station may transmit the PDCCH for the user data, which are transmitted on CC_2, wherein the CC_2 corresponds to a PDSCH dedicated CC, in a subframe before k number of subframes from a subframe in which the user data is transmitted. Herein, it will be assumed that PDCCH_1 and PDCCH_2, PDCCH_L respectively indicate control information being transmitted through CC_1 and CC_2, CC_L, and that PDSCH_1 and PDSCH_2, PDSCH_L respectively indicate user data being transmitted through CC_1 and CC_2, CC_L. Among the symbols configuring subframe N, the base station may transmit PDCCH_1 and PDCCH_2, PDCCH_L in some of the earlier symbols through CC_1, and the base station may transmit PDSCH_1 and PDSCH_L in the subframe N through each of CC_1 and CC_L. Additionally, in subframe N+k, the base station may transmit PDCCH_1 and its corresponding PDSCH_1 through CC_1, and, in subframe N+k, the base station may transmit PDSCH_2 corresponding to PDCCH_2, which is transmitted in the subframe N, through CC_2.

According to the present invention based upon the viewpoint of CC_2, the base station may transmit PDSCH_2 corresponding to PDCCH_2, which is transmitted in subframe N, to UE_1 through CC_2 in subframe N+k instead of subframe N. However, when a condition of having a symbol, in which PDCCH_3 is transmitted, placed before PDSCH_L, which is transmitted through CC_L, is satisfied, the PDSCH_L corresponding to the PDCCH_3 may be transmitted in subframe N through CC_L. More specifically, in configuring subframe N, PDCCH_L may be assigned to a symbol positioned before PDSCH_L. In case of CC_L, since the control information is/are assigned to the earlier symbol(s) of subframe N, when the PDSCH_L is transmitted in a symbol positioned after the symbol, in which the PDCCH_L is being transmitted, the UE_1 may decode the PDSCH_L without having to perform buffering on the PDSCH_L.

UE_1 may detect PDCCH_1 and PDCCH_2, PDCCH_L, which are transmitted through CC_1 in subframe N, may receive PDSCH_1, which is transmitted through CC_1 in subframe N, based upon the PDCCH_1, and also receive PDSCH_1, which is transmitted through CC_L in subframe N, based upon the PDCCH_L. Additionally, based upon the PDCCH_2, the UE_1 may detect PDSCH_2, which is transmitted through CC_2 in subframe N+k. Meanwhile, UE_2 may receive PDCCH_1, which is transmitted through the CC_1 in the subframe N+k, and, based upon the PDCCH_1 received in the subframe N+k, UE_2 may receive PDSCH_1, which is transmitted through CC_1 in the subframe N+k.

2. Subframe Offset Signaling

As described above, with reference to FIG. 18, according to the method for transmitting downlink control information according to the Type 2 method of FIG. 13, the subframe for the PDCCH transmission may be different from the subframe for the corresponding PDSCH transmission. In addition to the Type 2 method, in the method for transmitting downlink control information according to the Type 1 method of FIG. 13, the subframe for the PDCCH transmission may also be different from the subframe for the corresponding respective PDSCH transmission. Herein, the subframe offset k, which corresponds to the difference between the subframe for the PDCCH transmission and the subframe for the corresponding PDSCH transmission, may be pre-defined as a fixed value. However, the subframe offset k may also be defined as a value that may be varied depending upon the carrier characteristics or the channel environment. In case the value k is not a fixed value, the base station may be required to transmit information indicating the subframe offset k to the corresponding user equipment through the PDSCH or RRC signaling.

Referring to FIG. 18, the base station may transmit each of the subframe offsets k=1 and k=2, k=L for PDCCH_1 and PDCCH_2, PDCCH_L to UE_1 in subframe N through CC_1. The subframe offset may be transmitted through the corresponding PDCCH. Alternatively, the subframe offset may also be transmitted to the UE_1 through RRC signaling. Based upon the subframe offset, the UE_1 may be aware of the subframe in which the PDSCH corresponding to the PDCCH is being transmitted.

Meanwhile, in case of a CC carrying the PDCCH, since a PDSCH corresponding to the PDCCH or a PDSCH corresponding to another PDCCH is to be transmitted after the symbol duration, during which the PDCCH is transmitted, the base station may not transmit the information indicating the subframe offset to the user equipment.

Referring to FIG. 3, the exemplary embodiment of the present invention will be described once again as follows. The processor (400b) of the base station may allocate the PDCCH for a UE and its respective PDSCH to different CCs, so that k may be given a value greater than equal to 1 while being equal to or less than a predetermined value. However, when the base station processor (400b) allocates the PDCCH for a UE and its respective PDSCH to the same CC, the base station processor (400b) may allocate the PDCCH and the respective PDSCH so that the value k can be given a value equal to or greater than 0 and a value equal to or less than a predetermined value. By controlling the transmitter (100b) of the base station, the base station processor (400b) may transmit the PDCCH and the respective PDSCH to the UE through different CCs. However, the base station processor (400b) may also control the base station transmitter (100b) so that the corresponding PDSCH can be transmitted after k subframes from the subframe in which the PDCCH is transmitted. Additionally, the base station processor (400b) may generate information indicating the subframe offset k, and the base station processor (400b) may control the base station transmitter (100b), so as to transmit the generated information to the UE. The base station processor may control the base station transmitter (100b), so that the subframe offset k can be transmitted through the corresponding PDCCH. Alternatively, the base station processor may control the base station transmitter (100b), so that the subframe offset k can be transmitted in an RRC signaling format. Furthermore, the base station processor (400b) may control the base station transmitter (100b), so that CC indication information indicating the CC, through which the PDSCH is being transmitted, can be transmitted to the UE.

The processor (400a) of the UE may receive the PDCCH and the subframe offset, and the processor (400a) of the corresponding UE may be aware of the specific subframe through which the PDSCH associated with the PDCCH is being transmitted. Therefore, the processor (400a) of the UE may receive a PDSCH corresponding to the PDCCH through the corresponding CC based upon the PDCCH and the subframe offset. The processor (400a) may also be aware of the corresponding CC, through which the PDSCH is being transmitted, based upon the CC indication information that is transmitted by the base station.

<CRS Transmission in a Multi-Carrier System>

Figure 19:
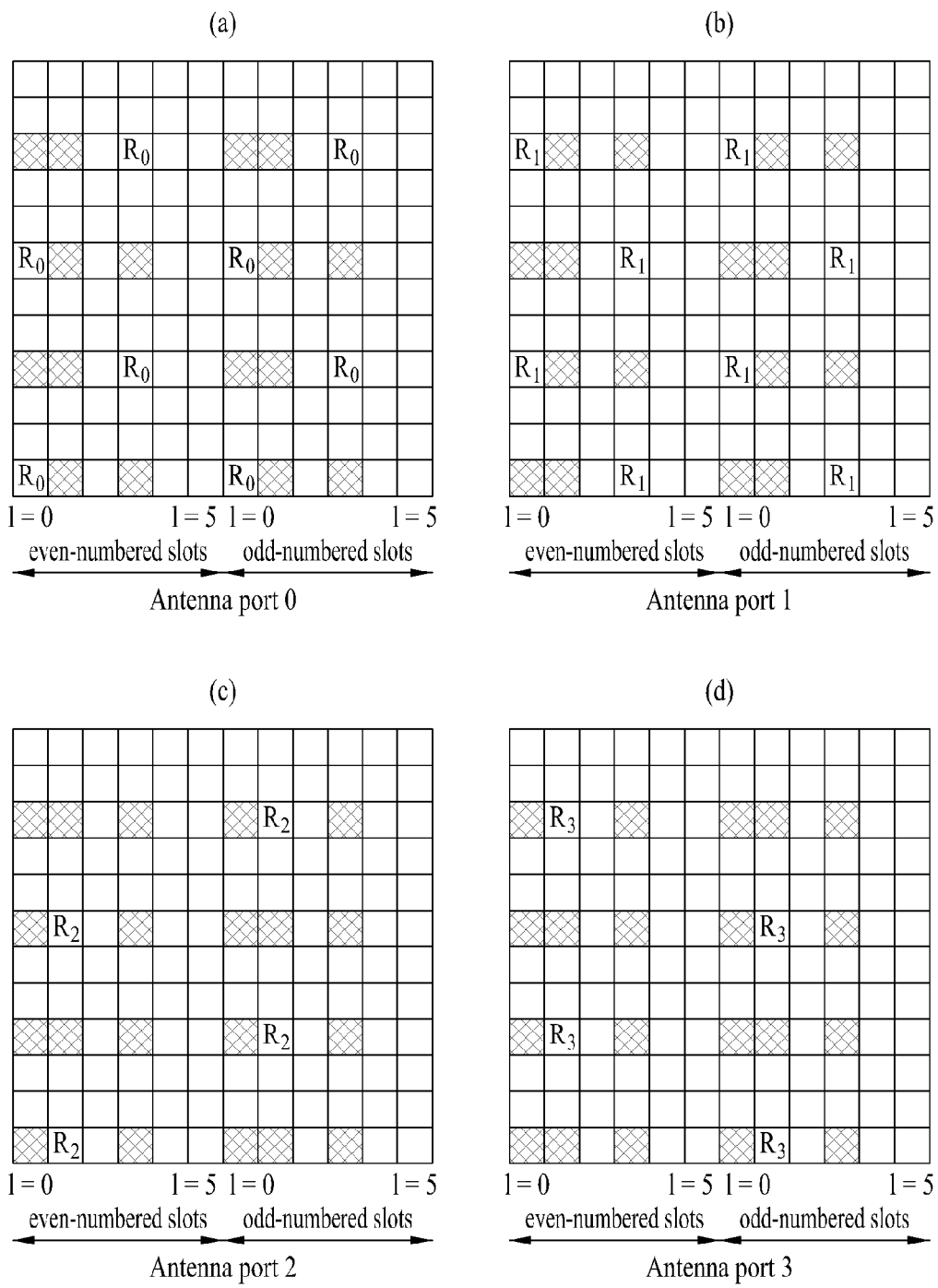
FIG. 19 illustrates an exemplary CRS pattern according to antenna ports.

FIG. 19 illustrates an exemplary CRS pattern according to an antenna port.

Referring to FIG. 19, CRS patterns for each antenna port are orthogonal to one another in the time/frequency domain. When the transmission device is given one antenna port, the antenna port transmits a CRS pattern for antenna port 0. When a 4Tx transmission is being used in the downlink, CRSs for antenna ports 0~3 may be used simultaneously. However, in order to minimize the interference between RS signals, in case a predetermined antenna port transmits its own CRS, the corresponding predetermined antenna port does not transmit a signal from an RE, through which CRSs for other antenna ports are being transmitted.

Meanwhile, according to the 3GPP LTE standard, a PDCCH is transmitted to a user equipment in a single antenna mode or a transmit diversity mode by using a CRS. Herein, a CRS (Common Reference Signal or Cell-specific Reference Signal) refers to a reference signal that is being used for the purpose of demodulation and measurement and that is being shared by all UEs within the cell. Up to the current days, the current 3GPP LTE-A standard is defined so that the PDCCH can be transmitted in a format identical to the format defined in the 3GPP LTE standard. When the PDCCH is transmitted to an LTE-A UE in the same format as the format defined in 3GPP LTE, the LTE-A UE may be capable of demodulating the PDCCH only after receiving the CRS. Therefore, when the PDCCH is transmitted to the LTE-A UE, the base station should also transmit the CRS along with the PDCCH.

In the present invention, when the base station configures a CC that can only be received by the LTE-A UE, the CC transmits a CRS only in a specific subframe. Unlike the LTE UE, which is required to be configured to receive the CRS in every subframe, the LTE-A UE may be configured to receive a CRS in only some of the subframes. For example, the base station may transmit a CRS in a specific subframe (or several specific subframes) within a single radio frame, and the base station may transmit the PDCCH and the PDSCH or only the PDSCH in the remaining subframes without any CRS. When the CRS is transmitted only in a predetermined subframe, the RE, through which the CRS has been transmitted in the conventional 3GPP LTE system, may be used in the transmission of the PDCCH or the PDSCH. Therefore, it may be advantageous in that the size of the downlink transmission data can be increased in the corresponding CC.

A CRS pattern for the LTE-A UE may be defined differently from the CRS pattern according to the 3GPP LTE standard. For example, among the OFDM symbols configuring a subframe, through which the CRS is being transmitted, the CRS pattern may be configured so that the CRS can be transmitted in only a specific OFDM symbol. However, for simplicity of the description, it will be assumed that the 3GPP LTE-A system uses the same CRS pattern as the 3GPP LTE system. When the 4Tx transmission is given as an example of the present invention, the base station may transmit the CRS patterns of FIG. 19(a) to FIG. 19(d) from each of the antenna ports 0 to 3 through the CC designated for the LTE-A UE.

The base station may configure the CC designated for the LTE-A UE, so that the corresponding CC can carry the PDCCH and PDSCH designated for the LTE-A UE, as shown in FIG. 14(c). And, the corresponding CC may also be configured to carry only the PDSCH, as shown in FIG. 14(b). More specifically, the base station processor (400b) may allocate both PDCCH and PDSCH designated for the LTE-A UE to the CC designated for the LTE-A UE (as shown in FIG. 14(c)), and the base station processor (400b) may also allocate only the PDSCH to the corresponding CC (as shown in FIG. 14(b)).

The subframe, through which the CRS is being transmitted, may be defined in advance. For example, among 10 subframes within a radio frame, the CRS may be defined in advance to be transmitted in subframe 0 and subframe 5. In this case, the transmission cycle period of the CRS becomes 5 subframes. Alternatively, the transmission cycle period of the CRS may be determined differently for each of the base station and the UE. The base station may decide the transmission cycle period of the CRS and may transmit information indicating the decided transmission cycle period of the CRS to the UE. The transmission cycle period may be transmitted to the UE through the PDCCH or through RRC signaling. The base station processor (400b) may also decide a transmission cycle period of the CRS, and the base station processor (400b) may control the base station transmitter (100b) so that information indicating the decided transmission cycle period of the CRS can be transmitted to the UE. The base station processor (400b) may control the base station transmitter (100b) so that the corresponding information can be transmitted to the UE through the PDCCH or RRC signaling.

The UE may be capable of identifying the subframe from which the CRS is being transmitted based upon the information indicating the transmission cycle period. In this case, the UE may detect the CRS in a subframe, which actually carries the CRS, on the corresponding CC without having to detect all of the subframes. Then, based upon the detected CRS, the UE may estimate the channel status. The receiver (300a) of the UE may receive information indicating the transmission cycle period, which is then delivered to the processor (400a) of the UE. Thereafter, based upon the transmission cycle period, the UE processor (400a) may control the receiver (300a), so that the receiver (300a) can detect the CRS from a subframe corresponding to the transmission cycle period, thereby estimating/measuring the channel status.

As described above, the detailed description of the present invention are provided herein so that anyone skilled in the art can implement and realize the embodiments of the present invention. Although the preferred embodiments of the present invention have been disclosed and described herein, the present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon the understanding and interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein.

INDUSTRIAL APPLICABILITY

The present invention may be used in a mobile station, base station, or other equipments of a wireless mobile communication system.

What is claimed is:

1. A method for transmitting, by a base station, downlink control information to a user equipment using a plurality of carriers in a wireless communication system, the method comprises:
   transmitting a first physical downlink control channel (PDCCH) carrying first control information, which is for transmission of a first physical downlink shared channel (PDSCH) and includes a carrier indication field set to indicate a first carrier among the plurality of carriers, and a second PDCCH carrying second control information, which is for transmission of a second PDSCH and includes a carrier indication field set to indicate a second carrier among the plurality of carriers, through the first carrier to the user equipment in a subframe n;
   transmitting the first PDSCH carrying first downlink data through the first carrier based on the first control information to the user equipment in the subframe n; and
   transmitting the second PDSCH carrying second downlink data through the second carrier based on the second control information to the user equipment in a subframe n+k when the second carrier is different from the first carrier and carries no PDCCH,
   wherein k is equal to 1or 2, and
   wherein the subframe n and the subframe n+k are downlink subframes.

2. The method of claim 1, further comprising:
   transmitting information indicating k to the user equipment.

3. The method of claim 2, wherein the second PDCCH carries the information indicating k.

4. A method of receiving, by a user equipment using a plurality of carriers, downlink control information in a wireless communication system, the method comprises:

receiving, by the user equipment, a first physical downlink control channel (PDCCH) carrying first control information, which is for reception of a first physical downlink shared channel (PDSCH) and includes a carrier indication field set to indicate a first carrier among the plurality of carriers, and a second PDCCH carrying second control information, which is for reception of a second PDSCH and includes a carrier indication field set to indicate a second carrier among the plurality of carriers, through the first carrier in a subframe n;

receiving, by the user equipment, the first PDSCH carrying first downlink data through the first carrier based on the first control information in the subframe n; and receiving, by the user equipment, the second PDSCH carrying second downlink data through the second carrier based on the second control information in a subframe n+k when the second carrier is different from the first carrier and carries no PDCCH, wherein k is equal to 1or 2, and wherein the subframe n and the subframe n+k are downlink subframes.

5. The method of claim 4, further comprising:
receiving information indicating k from the base station.

6. The method of claim 5, wherein the second PDCCH carries the information indicating k.

7. A base station of transmitting downlink control information to a user equipment using a plurality of carriers in a wireless communication system, the base station comprises:

a transmitter configured to transmit radio signals through the plurality of carriers; and a processor, connected to the transmitter, configured to control the transmitter to transmit a first physical downlink control channel (PDCCH) carrying first control information, which is for transmission of a first physical downlink shared channel (PDSCH) and includes a carrier indication field set to indicate a first carrier among the plurality of carriers, and a second PDCCH carrying second control information, which is for transmission of a second PDSCH and includes a carrier indication field set to indicate a second carrier among the plurality of carriers, through the first carrier to the user equipment in a subframe n; to transmit the first PDSCH carrying first downlink data through the first carrier based on the first control information to the user equipment in the subframe n; and to transmit the second PDSCH carrying second downlink data through the second carrier based on the second control information to the user equipment in a subframe n+k when the second carrier is different from the first carrier and carries no PDCCH, wherein k is equal to 1or 2, and wherein the subframe n and the subframe n+k are downlink subframes.

8. The base station of claim 7, wherein the processor is configured to control the transmitter to transmit information indicating k to the user equipment.

9. The base station of claim 8, wherein the second PDCCH carries the information indicating k.

10. A user equipment, using a plurality of carriers, of receiving downlink control information in a wireless communication system, the user equipment comprises:

a receiver configured to receive radio signals through the plurality of carriers; and a processor configured to control the receiver to receive a first physical downlink control channel (PDCCH) carrying first control information, which is for reception of a first physical downlink shared channel (PDSCH) and includes a carrier indication field set to indicate a first carrier among the plurality of carriers, and a second PDCCH carrying second control information, which is for reception of a second PDSCH and includes a carrier indication field set to indicate a second carrier among the plurality of carriers, through the first carrier in a subframe n; to receive the first PDSCH carrying first downlink data through the first carrier based on the first control information in the subframe n; and to receive the second PDSCH carrying second downlink data through the second carrier based on the second control information in a subframe n+k when the second carrier is different from the first carrier and carries no PDCCH, wherein k is equal to 1or 2, and wherein the subframe n and the subframe n+k are downlink subframes.

11. The user equipment of claim 10, wherein the processor is configured to control the receiver to further receive information indicating k from the base station.

12. The user equipment of claim 11, wherein the second PDCCH carries the information indicating k.

* * * * *